United States Patent
Chien et al.

(10) Patent No.: US 9,307,395 B2
(45) Date of Patent: Apr. 5, 2016

(54) AD-HOC GROUP BIDDING

(71) Applicants: AT&T Intellectual Property I, L.P., Atlanta, GA (US); AT&T Mobility II LLC, Atlanta, GA (US)

(72) Inventors: Ginger Chien, Bellevue, WA (US); Yehoshuva Arasavelli, Redmond, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 217 days.

(21) Appl. No.: 14/083,482

(22) Filed: Nov. 19, 2013

(65) Prior Publication Data

US 2015/0141067 A1   May 21, 2015

(51) Int. Cl.
- *H04B 7/00* (2006.01)
- *H04W 8/18* (2009.01)
- *H04W 4/08* (2009.01)
- *H04W 4/02* (2009.01)
- *H04W 84/18* (2009.01)

(52) U.S. Cl.
CPC ............... *H04W 8/186* (2013.01); *H04W 4/02* (2013.01); *H04W 4/08* (2013.01); *H04W 84/18* (2013.01)

(58) Field of Classification Search
CPC .......... H04W 8/186; H04W 4/08; H04W 4/02
See application file for complete search history.

(56) References Cited

U.S. PATENT DOCUMENTS

| | | | |
|---|---|---|---|
| 4,370,718 A | 1/1983 | Chasek | |
| 7,333,012 B1 | 2/2008 | Nguyen | |
| 7,564,377 B2 | 7/2009 | Kimchi et al. | |
| 7,653,394 B2 | 1/2010 | McMillin | |
| 8,036,824 B2 | 10/2011 | Huang et al. | |
| 8,484,045 B1 | 7/2013 | Fernandez et al. | |
| 8,489,320 B2 | 7/2013 | Braunstein | |
| 8,948,144 B1 * | 2/2015 | Issa .................. | H04W 4/00 370/338 |
| 2008/0094250 A1 | 4/2008 | Myr | |
| 2009/0146841 A1 | 6/2009 | Basson et al. | |
| 2012/0173360 A1 | 7/2012 | Soroca | |
| 2012/0323690 A1 | 12/2012 | Michael | |
| 2012/0326890 A1 | 12/2012 | Cross | |

(Continued)

FOREIGN PATENT DOCUMENTS

| | | |
|---|---|---|
| AU | 2008230158 | 10/2008 |
| GB | 2492629 | 9/2013 |
| WO | WO 0206994 | 1/2002 |

(Continued)

OTHER PUBLICATIONS

Iwanowski, Sebastian. "Auction-based traffic control on roads." Proceedings of the 7th World Congress on Intelligent TransportSystems. 2000.

Howe, Ben, et al. "Potential air traffic congestion solution: Slot allocation by auction method." Systems and Information Engineering Design Symposium, 2003 IEEE. IEEE, 2003.

*Primary Examiner* — Edward Urban
*Assistant Examiner* — Mohammed Rachedine
(74) *Attorney, Agent, or Firm* — Greenblum & Bernstein, P.L.C.

(57) ABSTRACT

Mobile devices band together in an ad hoc grouping based on their location. As the mobile devices travel, their users may have a shared, mutual goal at a common location. The mobile devices having the common location are invited to join the ad hoc grouping. Should any of the mobile devices accept and join the ad hoc grouping, the users may act as a cohesive unit and bid to achieve their shared, mutual goal.

20 Claims, 22 Drawing Sheets

(56) References Cited

U.S. PATENT DOCUMENTS

2013/0013180 A1    1/2013   Lection et al.
2013/0059607 A1    3/2013   Herz et al.

FOREIGN PATENT DOCUMENTS

WO    WO 2012059275      5/2012
WO    WO 2013147902 A1 * 10/2013  .......... H04L 12/1822

* cited by examiner

AD-HOC GROUP BIDDING

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Mobile communications have revolutionized our encounters. As we travel throughout the day, our mobile devices encounter other mobile devices in cars, in stores, and in our work. These encounters present opportunities for group purchases, group discounts, and other shared interests.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 10-12 are diagrams illustrating self-organization of the ad hoc group, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
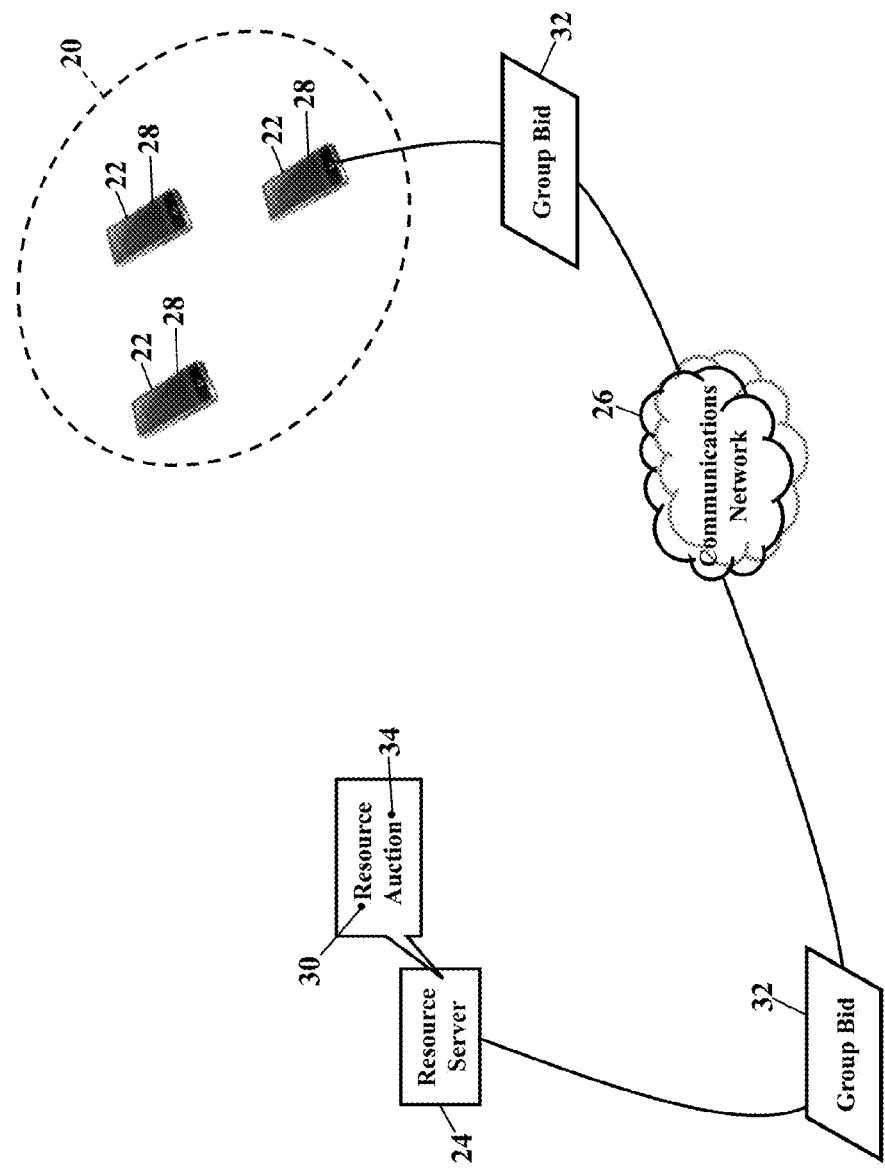
FIGS. 1-3 are simplified schematics illustrating an environment in which exemplary embodiments may be implemented.
Figure 2:
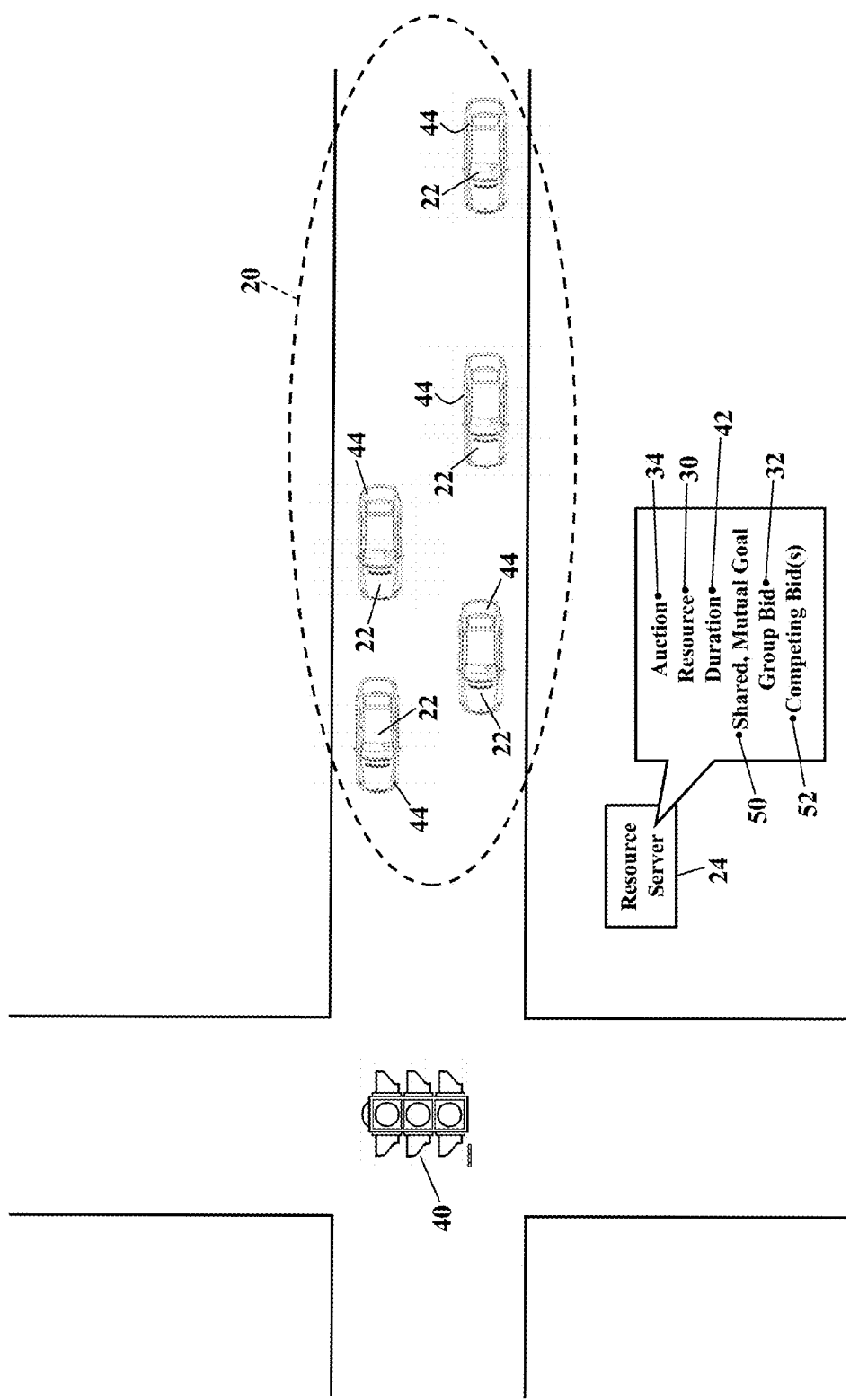
Figure 3:
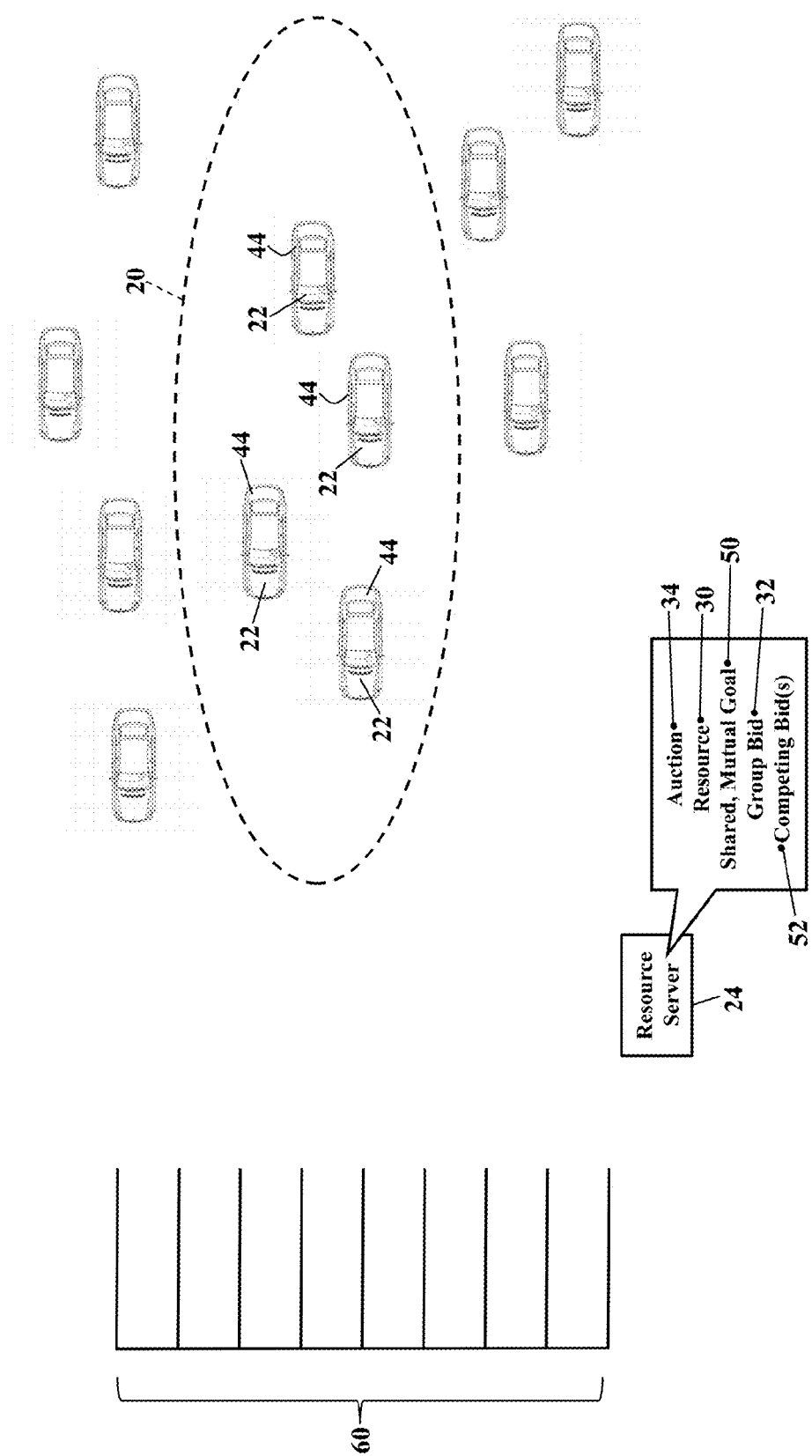

FIGS. 1-3 are simplified schematics illustrating an environment in which exemplary embodiments may be implemented. A group 20 of mobile devices 22 communicates with a resource server 24 using a communications network 26. Each mobile device 22, for simplicity, is illustrated as a smart phone 28. Each mobile device 22, though, may be any mobile or stationary processor-controlled device (as later paragraphs will explain). Regardless, exemplary embodiments allow the group 20 of the mobile devices 22 to band together ad hoc and request some resource 30 from the resource server 24. That is, the mobile devices 22 may spontaneously encounter each other and cooperate in real time to improve their collective chances of receiving the resource 30 from the resource server 24. The group 20 of the mobile devices 22, for example, may submit a group bid 32 for the resource 30. The resource server 24 may auction 34 the resource 30 to the highest bid. The group 20 of the mobile devices 22 may thus spontaneously form in an ad hoc fashion to increase their collective chance of winning the auction 34. If the ad hoc group 20 of the mobile devices 22 wins the auction 34, then the same ad hoc group 20 collectively receives the resource 30 from the resource server 24.

FIG. 2 illustrates traffic resources. Here, the ad hoc group 20 of the mobile devices 22 is explained using a common traffic situation. Suppose the resource server 24 controls a traffic light 40 at an intersection of multiple roads. The resource server 24 may conduct the auction 34 and accept bids to change, or to maintain, the traffic light 40 in a "red" or "green" state. The auctioned resource 30, then, may be a duration 42 of time associated with a state of the traffic light 40. As several vehicles 44 approach the intersection, the drivers may all desire to keep the traffic light 40 "green" for a longer duration 42 of time, thus allowing their respective vehicles 44 to speed through the intersection without stopping. Exemplary embodiments thus allow the drivers' mobile devices 22 to form the ad hoc group 20 and to negotiate with the resource server 24 to keep the traffic light 40 green. That is, the drivers' mobile devices 22 discover that they all have a shared, mutual goal 50 in keeping the traffic light 40 in its green state. The mobile devices 22 thus spontaneously form the ad hoc group 20 and mutually agree to submit the group bid 32 (e.g., to keep the traffic light 40 green for the longer duration 42 of time). When the resource server 24 receives the group bid 32, the resource server 24 evaluates the group bid 32 against other, competing bids 52. Indeed, at a busy intersection, there likely will be a competing bid from other vehicles to shorten the duration 42 of time to change the traffic light 40 to "red." If the ad hoc group 20 of the mobile devices 22 wins the auction 34, then the resource server 24 times the traffic light 40 to ensure all the vehicles 44 in the ad hoc group 20 speed through the intersection.

FIG. 3 illustrates parking resources. Here, the ad hoc group 20 of the mobile devices 22 bids for parking spaces 60 at some event (such as a football game or concert). Suppose the resource server 24 assigns the parking spaces 60 in a parking garage. As the reader may understand, there may be hundreds, even thousands, of the vehicles 44 vying for a limited number of the parking spaces 60. As many vehicles 44 approach the parking facility, the drivers may band together and submit the group bid 32 for all or some of the parking spaces 60. The drivers' mobile devices 22 discover that they all have the shared, mutual goal 50 in obtaining one of the few available parking spaces 60. The mobile devices 22 thus spontaneously form the ad hoc group 20 and mutually agree to submit the group bid 32 for several ones of the parking spaces 60. The resource server 24 evaluates the group bid 32 against the other, competing bids 52 for the same parking spaces 60. If the ad hoc group 20 of the mobile devices 22 wins the auction 34, then the resource server 24 assigns the parking spaces 60 to all the vehicles 44 in the ad hoc group 20. The drivers have thus obtained the resource 30 (e.g., the parking spaces 60) in an ad hoc cooperative fashion, and likely closer to the venue than they could individually obtain.

Here, then, exemplary embodiments establish ad hoc communications among ad hoc groupings. Exemplary embodiments allow individual users (i.e., their mobile devices 22) to discover each other and their shared, mutual intent or goal 50. While the above paragraphs explained the traffic light 40 and the parking spaces 60, the reader should realize that exemplary embodiments may be applied to any objective or purpose that is shared by the ad hoc group 20. Whatever the ad hoc group 20 desires to achieve, exemplary embodiments allow the mobile devices 22 to discover each other and to band together to improve the group result.

Figure 4:
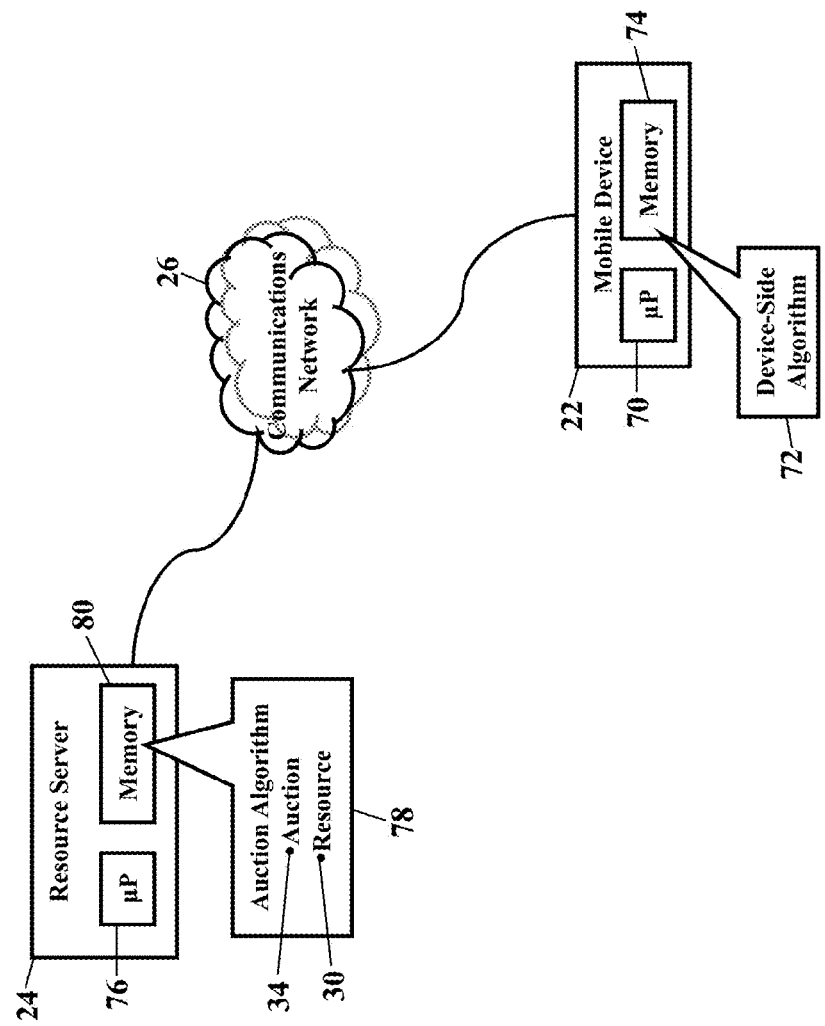
FIGS. 4-5 are more detailed schematics illustrating the operating environment, according to exemplary embodiments.
Figure 5:
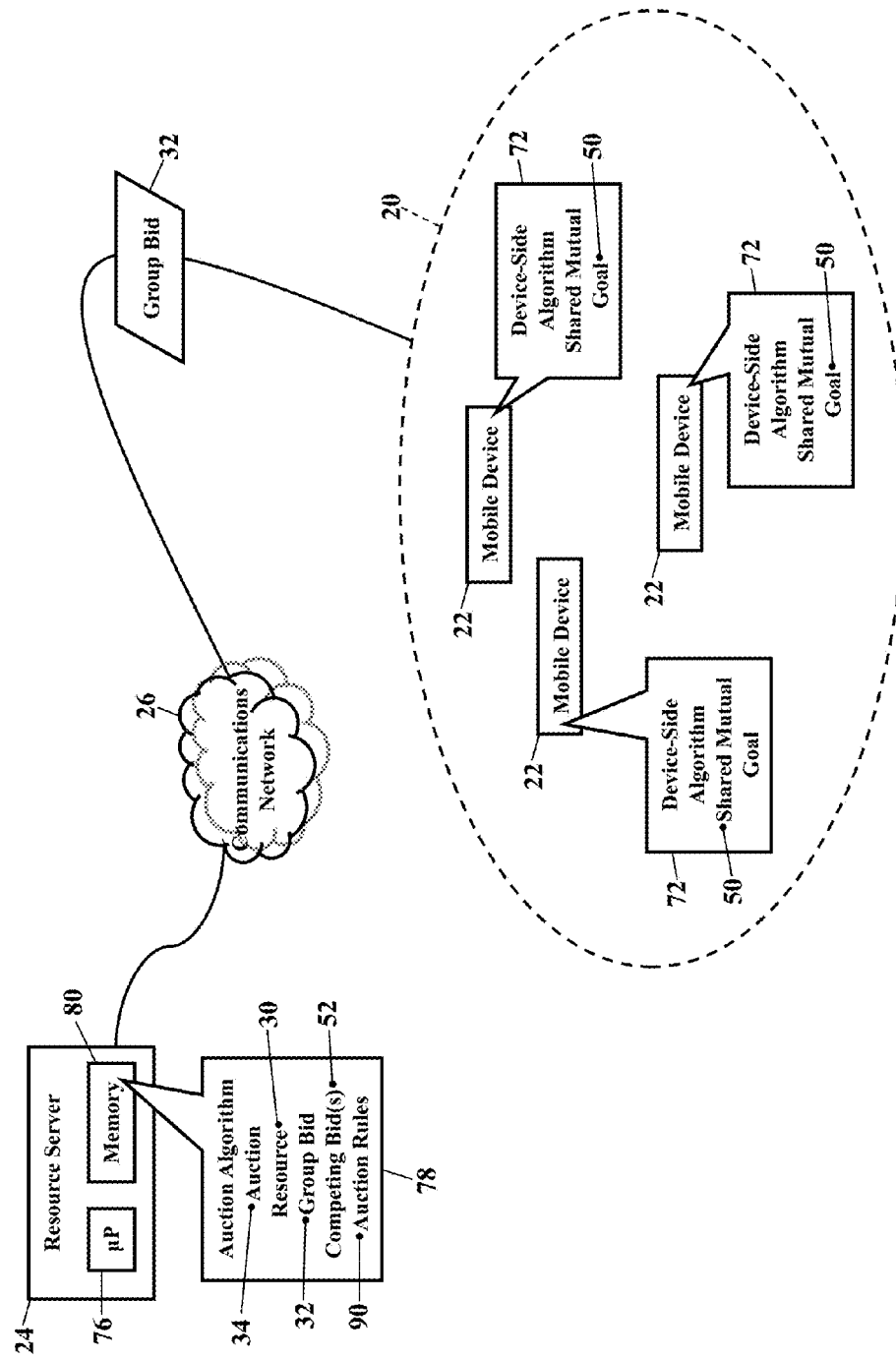

FIGS. 4-5 are more detailed schematics illustrating the operating environment, according to exemplary embodiments. FIG. 4 illustrates one of the mobile devices 22 communicating with the resource server 24 using the communications network 26. The mobile device 22 may have a processor 70 (e.g., "μP"), application specific integrated circuit (ASIC), or other component that executes a device-side algorithm 72 stored in a local memory 74. The resource server 24 may also have a processor 76 (e.g., "μP"), application specific integrated circuit (ASIC), or other component that executes an auction algorithm 78 stored in a local memory 80. The device-side algorithm 72 and the auction algorithm 78 may thus include instructions, code, and/or programs that cooperate in a server-client relationship, via the communications network 26, to conduct the auction 34 for the resource 30.

FIG. 5 illustrates the ad hoc group 20 of the mobile devices 22. While only three (3) mobile devices 22 are shown, the ad hoc group 20 may have a membership of many, even hundreds or thousands, of the mobile devices 22. Each of the mobile devices 22 in the ad hoc group 20 may store and execute the device-side algorithm 72. The members of the ad hoc group 20 determine their shared, mutual goal 50, as later paragraphs will explain. The ad hoc group 20 submits, or authorizes, the group bid 32 for the resource 30. The auction algorithm 78 causes the resource server 24 to evaluate the group bid 32 against the one or more competing bids 52 and auction rules 90. If the group bid 32 wins the auction 34, then the auction algorithm 78 causes the resource server 24 to award the resource 30 to the ad hoc group 20. That is, each mobile device 22, that is a member of the ad hoc group 20, receives the resource 30.

Exemplary embodiments may utilize any processing component, configuration, or system. Any of the processors could be multiple processors, which could include distributed processors or parallel processors in a single machine or multiple machines. Any of the processors can be used in supporting a virtual processing environment. Any of the processors could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Exemplary embodiments may be applied regardless of networking environment. As the above paragraphs mentioned, the communications network 26 may be a wireless network having cellular, WI-FI®, and/or BLUETOOTH® capability. The communications network 26, however, may be any wireless long- or short-range network, such as near-field communications and other radio frequency networks. The communications network 26 may be a cable network operating in the radio-frequency domain and/or the Internet Protocol (IP) domain. The communications network 26, however, may also include a distributed computing network, such as the Internet (sometimes alternatively known as the "World Wide Web"), an intranet, a local-area network (LAN), and/or a wide-area network (WAN). The communications network 26 may include any physical link or wiring, such as coaxial cables, copper wires, fiber optic lines, and/or hybrid-coaxial lines. The communications network 26 may even include wireless portions utilizing any portion of the electromagnetic spectrum and any signaling standard (such as the IEEE 802 family of standards, GSM/CDMA/TDMA or any cellular standard, and/or the ISM band). The communications network 26 may even include power line portions, in which signals are communicated via electrical wiring. The concepts described herein may be applied to any wireless/wireline communications network, regardless of physical componentry, physical configuration, or communications standard(s).

Figure 6:
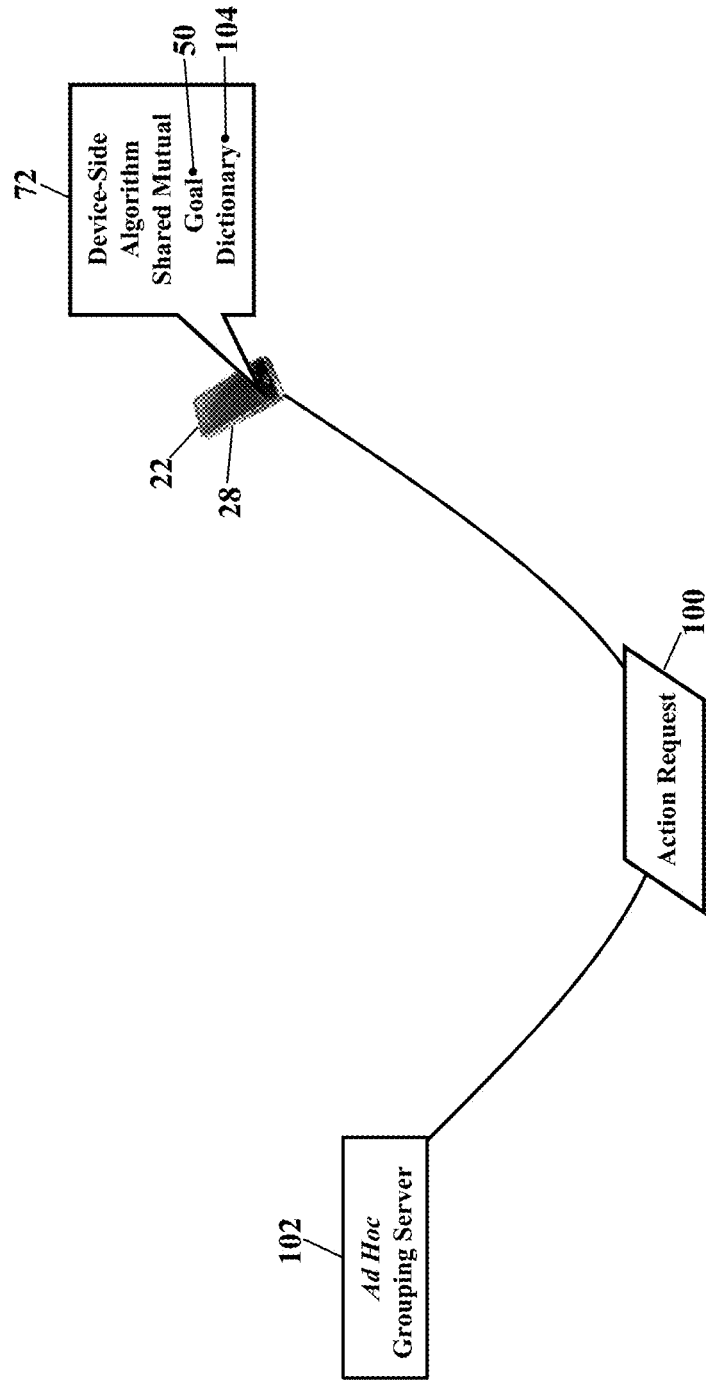
FIGS. 6-11 are diagrams illustrating formation of an ad hoc group, according to exemplary embodiments.

FIGS. 6-11 are diagrams illustrating formation of the ad hoc group 20, according to exemplary embodiments. FIG. 6 illustrates a solicitation to form the ad hoc group (illustrated as reference numeral 20 in FIGS. 1-3 & 5). As the user goes about her day, she may wish to band together with other like-minded users to achieve the shared, mutual goal 50. Whatever purpose she wishes to achieve, her mobile device 22 sends an action request 100. FIG. 6 illustrates the action request 100 communicating to a network address of an ad hoc grouping server 102. The ad hoc grouping server 102 is a network-centric, cloud-based resource that forms and manages ad hoc groupings. The action request 100, however, may be sent directly to other candidate mobile devices 22, as later paragraphs will explain. In FIG. 6, though, exemplary embodiments may utilize the ad hoc grouping server 102 to form the ad hoc group 20. The action request 100 may be formatted using a dictionary 104 of standard, commonly defined terms that all recipients recognize and understand. The action request 100, for example, may be formatted as ACTION_REQUEST[action code], where the term "action code" is chosen from the dictionary 104 of standard, common terms. The action code may thus be a standardized, alphanumeric combination that is assigned to the goal 50. Using the above examples, the action code may be a protocol that is defined for increasing the duration of time for the "green" traffic light (illustrated, respectively, as reference numerals 44 and 40 in FIG. 2) or for obtaining the parking spaces (illustrated as reference numeral 60 in FIG. 3). These are simple examples, of course. In practice the dictionary 104 may contain many, even hundreds, of different definitions for action codes, reflecting many different common goals 50 of many different outcomes.

The action request 100 may be more specific. When the user determines her goal 50, the goal 50 may likely have an associated time, location, and/or other parameters. Again using the traffic light 40 as an example, the user may be required to specify the duration 42 of time for maintaining its state (e.g., red or green). Moreover, the action request 100 may uniquely identify the traffic light 40, such as with its geographical location (perhaps using global positioning system coordinates or other alphanumeric identifier). The action request 100, then, may further include accompanying parameters, such as ACTION_REQUEST[action code, timing, location, amount, parameter(s)].

The action request 100 may thus specify any number of parameters to accompany the action code. The action request 100, of course, likely specifies some financial amount, which may be in conventional currency or tokens. Whatever the parameters, their values and/or codes are preferably formatted and commonly understood, according to the dictionary 104, to achieve the shared, mutual goal 50.

Figure 7:
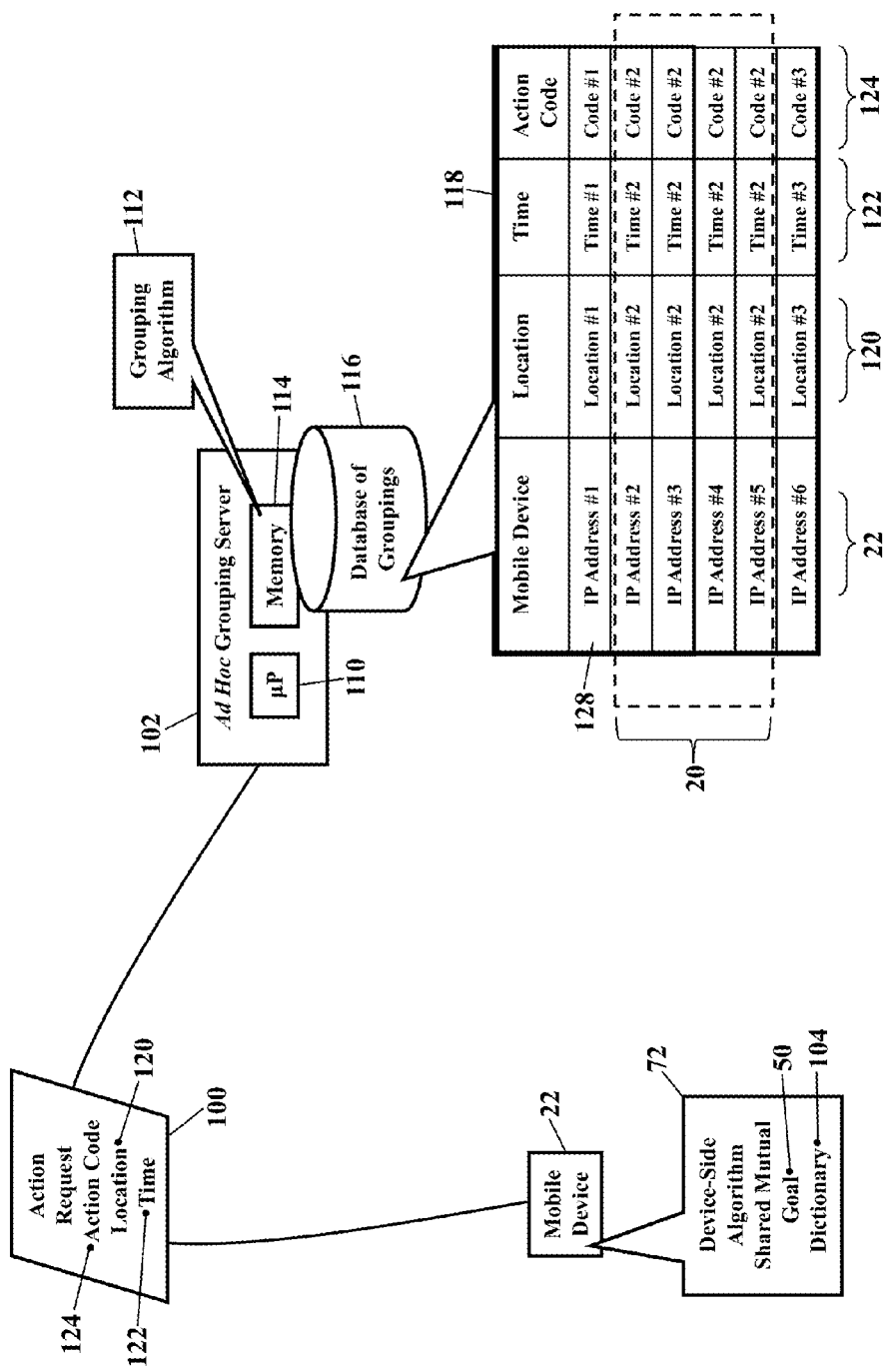

FIG. 7 illustrates candidate recipients of the action request 100. When the mobile device 22 sends the action request 100, the action request 100 is likely only useful for like-minded users. That is, only those users potentially having the same goal 50 will want to receive the action request 100. If the action request 100 has no relevance to a user, the action request 100 may be unwelcome spam.

FIG. 7, then, illustrates location-based groupings. The action request 100 may route to the network address (e.g., Internet Protocol address) of the ad hoc grouping server 102. The ad hoc grouping server 102 may be a centralized destination for all action requests 100. The ad hoc grouping server 102 has a processor 110 (e.g., "μP"), application specific integrated circuit (ASIC), or other component that executes a grouping algorithm 112 stored in a local memory 114. The device-side algorithm 72 and the ad hoc grouping algorithm 112 may thus include instructions, code, and/or programs that cooperate in a server-client relationship to form the ad hoc group 20. When the ad hoc grouping server 102 receives the action request 100, the ad hoc grouping algorithm 112 causes the processor 110 to consult a database 116 of groupings. The database 116 of groupings maintains a centralized listing of the action requests 100 requested by different mobile devices 22 that wish to form ad hoc groupings to achieve any mutually shared goal 50. FIG. 7 illustrates the database 116 of groupings locally stored in the memory 114 of the ad hoc grouping server 102, but the database 116 of groupings may be remotely maintained and accessed. Regardless, the database 116 of groupings is illustrated as a table 118 that maps, relates, or associates the mobile device 22 to its current location 120, time 122, and the action code 124 specified in the access request 100. Each entry in the database 116 of groupings may thus be populated with different action requests 100 that are requested by different mobile devices 22. When the ad hoc grouping server 102 receives the action request 100, the ad hoc grouping algorithm 112 may query the database 116 of groupings for the same action code 124 having the same (or nearly the same) location 120 and a contemporaneous time 122. If the action code 124, location 120, and/or time 122 match any entries in the database 116 of groupings, the ad hoc grouping algorithm 112 retrieves the corresponding network addresses 128 of the candidate mobile devices 22 potentially having the same shared, mutual goal 50. FIG. 7 illustrates the ad hoc group 20 as those mobile devices 20 having matching locations 120, times 122, and action codes 124.

Groupings, of course, may be based on any affinity. The above explanation uses the matching locations 120 to find the candidate mobile devices 22. Ad hoc groupings, though, may be determined using any query parameter that is shared among the mobile devices 22. Ad hoc groupings, for example, may be formed for group purchases of movie tickets, gasoline, replacement windows, tires, and milk. Indeed, the database 116 of groupings may be populated with any information desired for grouping candidate mobile devices 22. Exemplary embodiments may form ad hoc groupings for any expression or indication of a shared affinity. Affinity may even be expressed in varying terms, from any minimum value to any maximum value.

Figure 8:
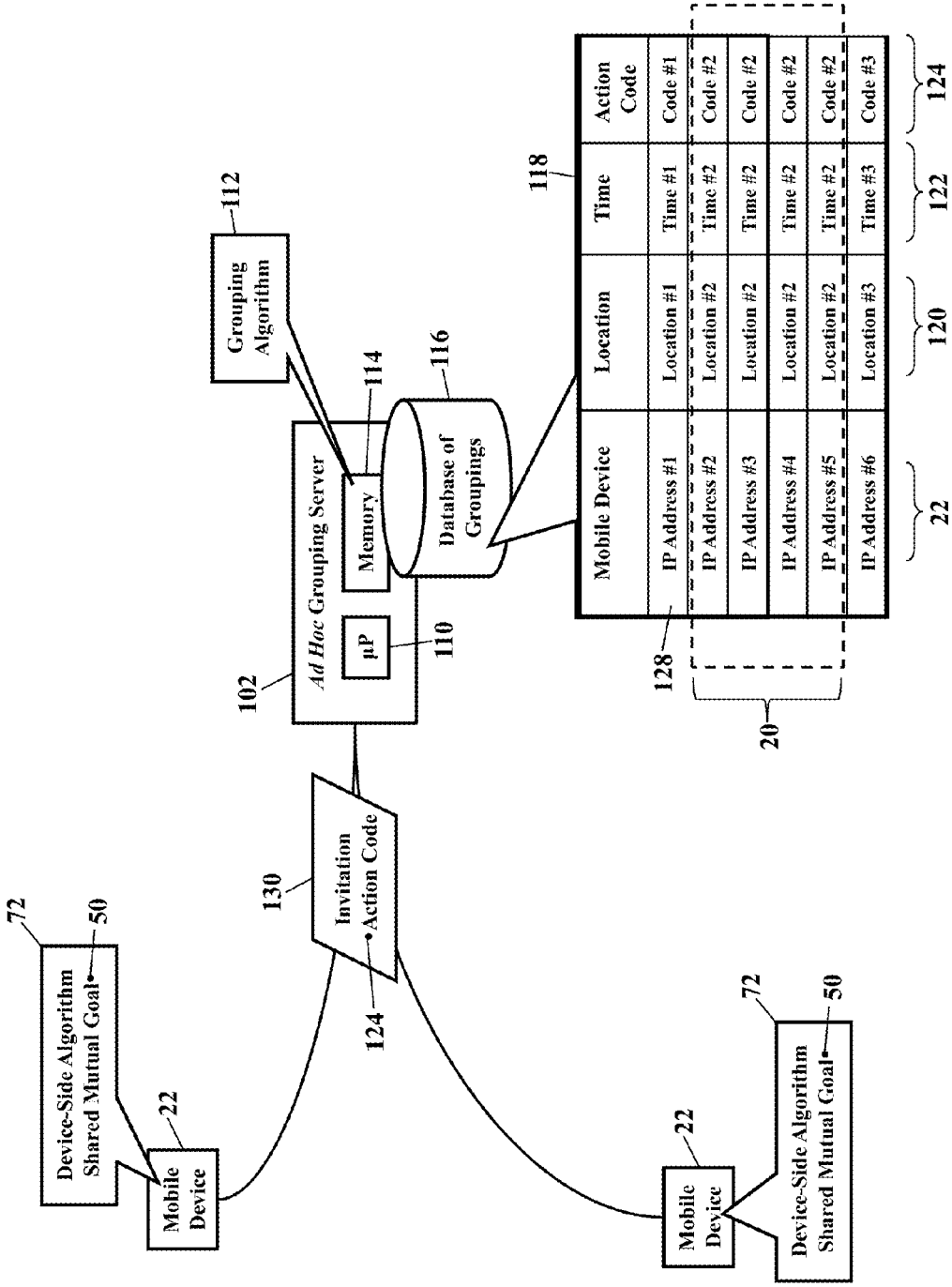

FIG. 8 illustrates invitations 130 to the candidate mobile devices 22. Once the potential ad hoc group 20 is determined, the ad hoc grouping server 102 invites the candidate mobile devices 22 to join the ad hoc group 20. As FIG. 8 illustrates, the ad hoc grouping algorithm 112 causes the ad hoc grouping server 102 to send the invitation 130 to each one of the network addresses 128 of each candidate mobile device 22. When the candidate mobile device 22 receive their respective invitation 130, the user may decide if she wants to join the ad hoc group 20 to achieve the same shared, mutual goal 50 (as represented by the common action code 124).

Figure 9:
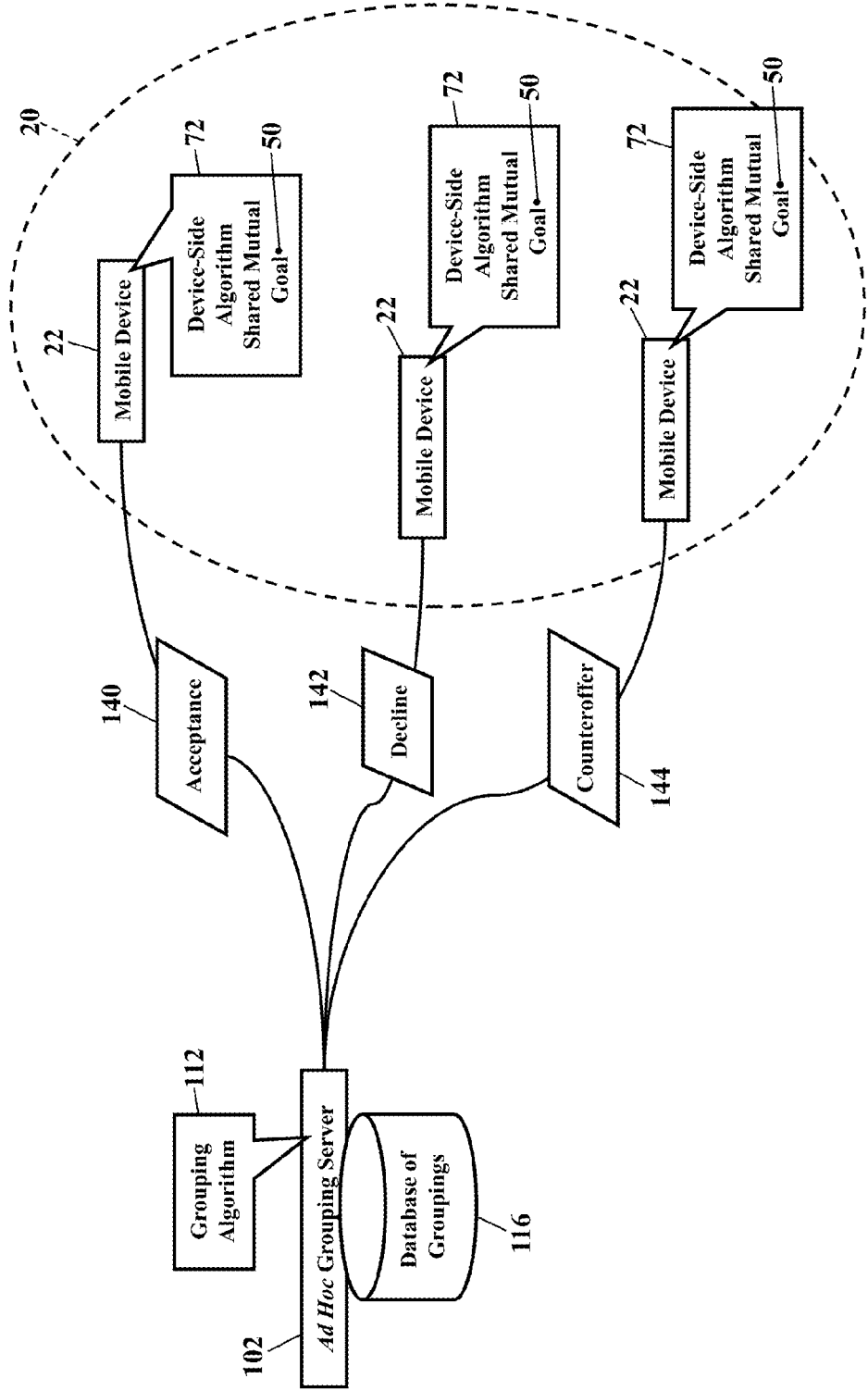

FIG. 9 illustrates negotiations of group intention. Once the candidate mobile devices 22 are invited to join the ad hoc group 20, the recipients may accept, decline, or counteroffer. That is, any user may cause her mobile device 22 to send an acceptance 140 to join the ad hoc group 20 for the same shared, mutual goal 50. If a user has no interest in joining, a decline 142 may be sent to the ad hoc grouping server 102. One or more mobile devices 22, however, may want to alter the parameters and continue negotiation. A counteroffer 144 may then be sent back to the ad hoc grouping server 102 with standardized options for changing or tweaking the shared, mutual goal 50. The counteroffer 144, for example, may be formatted as COUNTEROFFER[options], where the user specifies her desired changes to the shared, mutual goal 50 using standard terminology from the dictionary (illustrated as reference numeral 104 in FIG. 6). Negotiations may similarly continue until no more counteroffers 144 are made. That is, negotiations may continue until all potential members either accept or decline. Negotiations may also terminate after a configurable time or number of counteroffers 144.

Exemplary embodiments thus automate the formation of the ad hoc group 20. As the shared, mutual goal 50 may be time and location dependent (as explained with reference to FIGS. 7-8), automation is desired to reap the benefit in a reasonable amount of time. The formation of the ad hoc group 20, in other words, is meaningless should the mutual time or mutual location (illustrated as reference numerals 122 and 124 in FIGS. 7-8) pass without action. Exemplary embodiments may thus impose rules and/or limits on negotiations to ensure the potential members may still receive the shared, mutual goal 50 within any imposed time limit. Exemplary embodiments may thus use simplified, finite protocols with just one round of negotiation and concluding the group formation with only the final parties that agree.

Figure 10:
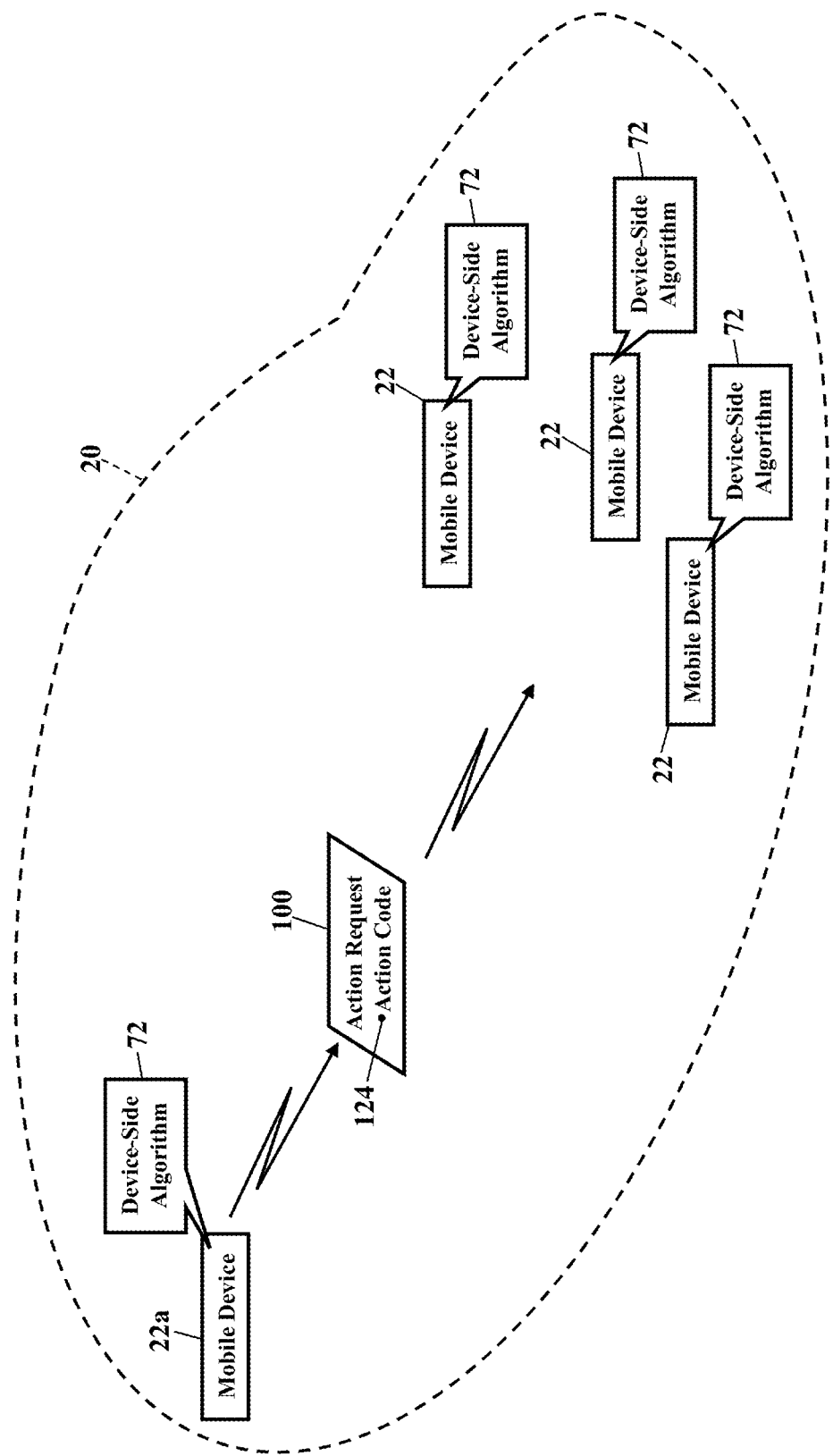
Figure 11:
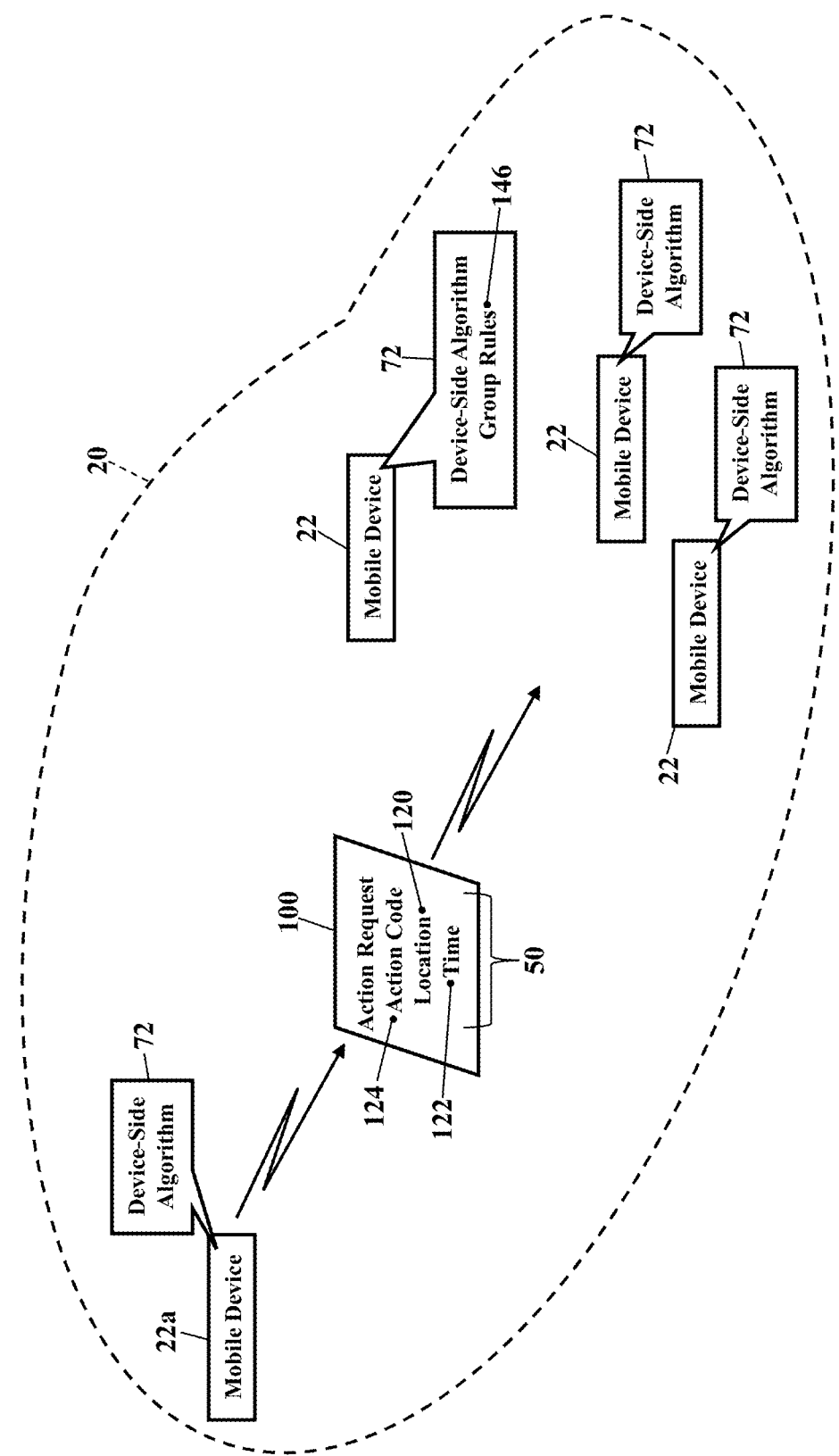
Figure 12:
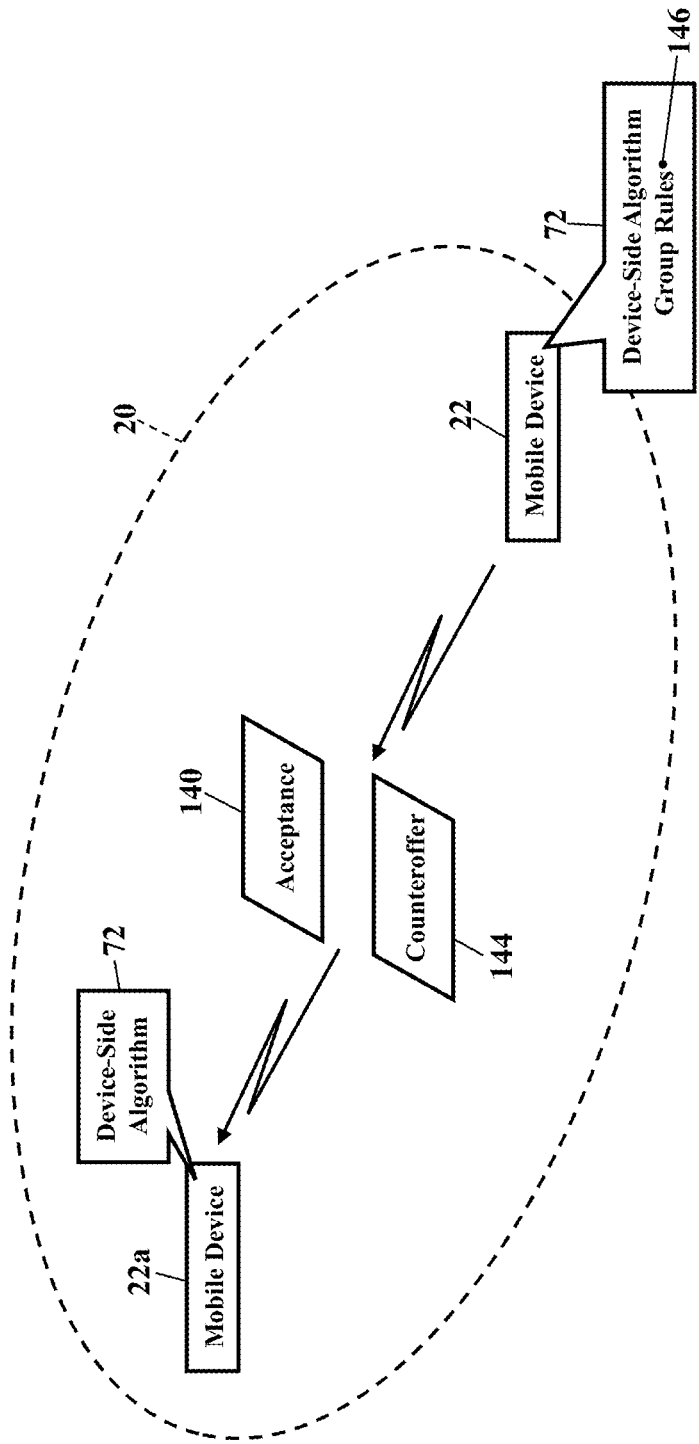

FIGS. 10-12 are diagrams illustrating self-organization of the ad hoc group 20, according to exemplary embodiments. Here the mobile devices 22 themselves may orchestrate and manage their ad hoc grouping. The ad hoc group 20, in other words, may be self-moderated with little or no centralized oversight. FIG. 10, for example, illustrates one of the mobile devices 22a broadcasting the action request 100. The mobile device 22a may open a WI-FI® or BLUETOOTH® hotspot, for example, but the action request 100 may be broadcast using any frequency or standard. Regardless, the action request 100 may be received by any candidate mobile devices 22. The action request 100, as earlier explained, may be formatted using the dictionary 104 of standard, commonly defined terms that all recipients recognize and understand (as FIG. 6 illustrated). The action request 100 may use the standardized action code 124 assigned to the goal 50 (as FIGS. 6-7 illustrated). As the action request 100 is broadcast to any mobile devices 22, the action request 100 is received by any of the candidate mobile devices 22 in the vicinity. Some users will be receptive to receiving the action request 100, and so receptive recipient devices will be configured to receive solicitations to form ad hoc groupings. Other users, though, will have no interest, so their mobile devices 22 may be configured to reject receipt of the action request 100.

Here, then, the action request 100 may be an implicit invitation. As the action request 100 may be broadcast to any mobile devices 22, the action request 100 implicitly invites other mobile devices 22 to form the ad hoc group 20 to achieve the same shared, mutual goal 50 (as represented by the action code 124).

As FIG. 11 illustrates, the receptive mobile devices 22 will receive and process the action request 100. Should any mobile device 22 receive the action request 100, its device-side algorithm 72 may compare the parameters in the action request 100 to the user's group rules 146. The user's group rules 146 help determine if participation is desired. The user's group rules 146, for example, may be a list of different action codes 124 for which the user has an interest or affinity. If the action code 124 specified in the action request 100 does not match an entry in the user's group rules 146, then the action request 100 may be ignored or declined. If the action code 124 matches the user's group rules 146, then the action request 100 may be further evaluated. The action request 100, for example, may have more parameters specifying the location 120 and the time 122 of the requested ad hoc grouping. The action request 100 may also specify financial or other contributions that are requested of every potential ad hoc group member. The action request 100, of course, may have many parameters defining the shared, mutual goal 50 for which grouping is desired. The device-side algorithm 72 may visually or audibly generate a prompt to confirm participation in the requested ad hoc grouping.

As FIG. 12 illustrates, a response may be sent. If user's group rules 146 permit participation, the device-side algorithm 72 may generate and send the acceptance 140 back to the requesting mobile device 22a. The acceptance 140, for example, may be broadcast for receipt by the requesting mobile device 22a. If the network address of the requesting mobile device 22a is known (perhaps from the action request 100), then the acceptance 140 may be sent to the corresponding network address. Any user, of course, may manually cause the device-side algorithm 72 to send the acceptance 140 (such as after viewing the prompt for the action request 100 in FIGS. 10-11). Exemplary embodiments, however, may also permit continued negotiations, such as by broadcasting the counteroffer 144 that changes or tweaks the shared, mutual goal 50. As the mobile device 22a requested the ad hoc grouping, it is likely that the user of the mobile device 22a will take a lead role determining how much negotiation takes place. The user of the requesting mobile device 22a, in other words, may arbitrate the formation of the ad hoc group 20. Formational control, however, may transfer to a different user of a different mobile device 22 (such as by a new action request 100).

Exemplary embodiments may thus locally form and manage the formation of the ad hoc group 20. Mobile devices 22 may broadcast and receive different action requests 100 specifying different shared, mutual goals 50. Mobile devices 22 may thus self-form and manage the ad hoc group 20 without central oversight. Formation and management may be functionally performed by any group member or amongst a mesh net of participating nodes that self-organize the ad hoc group 20.

Figure 13:
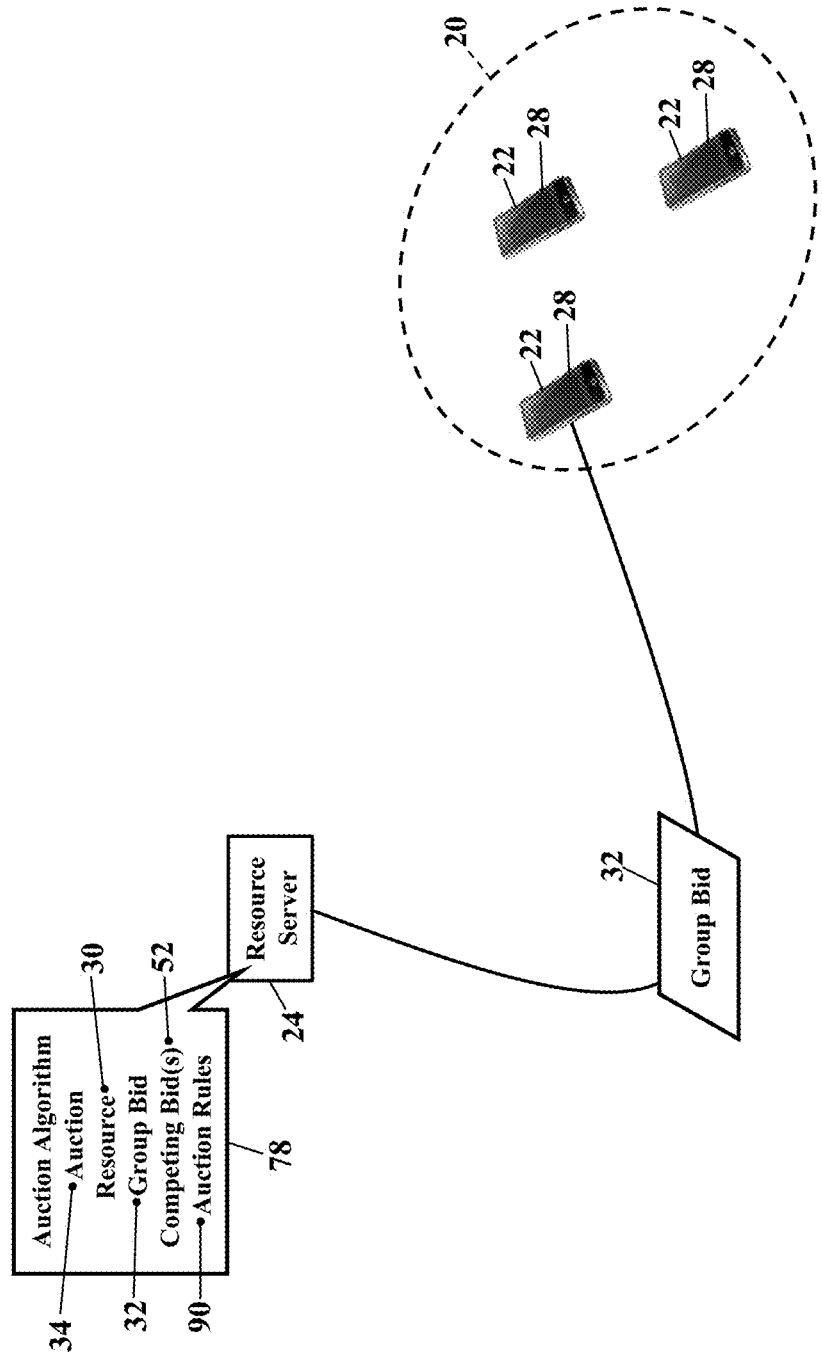
FIGS. 13-14 are diagrams illustrating an auction, according to exemplary embodiments.
Figure 14:
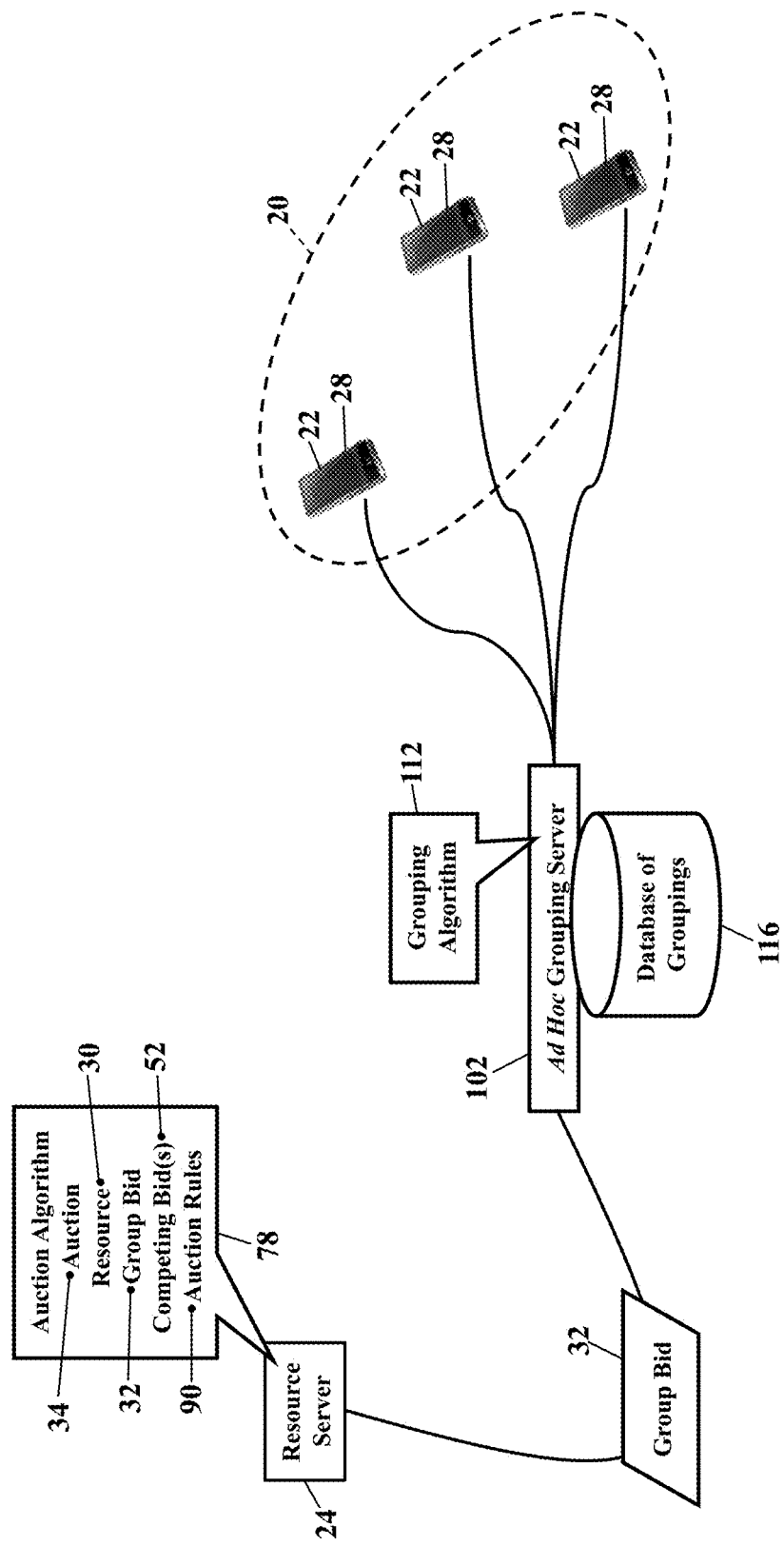

FIGS. 13-14 are diagrams illustrating the auction 34, according to exemplary embodiments. Once the ad hoc group 20 is formed, the ad hoc group 20 submits the group bid 32 for the resource 30. FIG. 13 illustrates the group bid 32 originating from one of the mobile devices 22 in the ad hoc group 20. One of the mobile devices 22 may be considered the leader of the ad hoc group 20 and submits the group bid 32 as a proxy for the other members. FIG. 14, however, illustrates the group bid 32 originating from ad hoc grouping server 102. As the ad hoc grouping server 102 may manage and track the formation of the ad hoc group 20, the ad hoc grouping server 102 may also be tasked with submitting the group bid 32. Regardless, when the resource server 24 receives the group bid 32, the resource server 24 conducts the auction 34 and evaluates the group bid 32 against the competing bids 52 and the auction rules 90. Any criteria may be used to determine the winning bid. Once the auction 34 is final, the resource server 24 may notify the member mobile devices 22 of their winning or losing group bid 32. The resource server 24, in other words, may individually send an auction outcome to each mobile device 22 in the ad hoc group 20, or the resource server 24 may notify the ad hoc grouping server 102 for further distribution to the member mobile devices 22. If the ad hoc group 20 wins the auction 34, the members of the ad hoc group 20 receive the resource 30.

The reader may notice anonymity in the solution. As the ad hoc grouping server 102 may form and manage the ad hoc group 20, the actual members need not know each other's identities. Users may thus band together for the shared, mutual goal 50 without revealing their individual identities. The ad hoc grouping server 102 may be the source and destination for all group communications, thus keeping each member's identity private from all other members. Indeed, the ad hoc grouping server 102 may even submit the group bid 32 without revealing the membership addresses or identities of the ad hoc group 20. As long as the members share the same mutual goal 50, people may economically band together without regard for personalities, social considerations, and biases. Legality of the mutual goal 50, however, may be handled by the auction rules 90.

Figure 15:
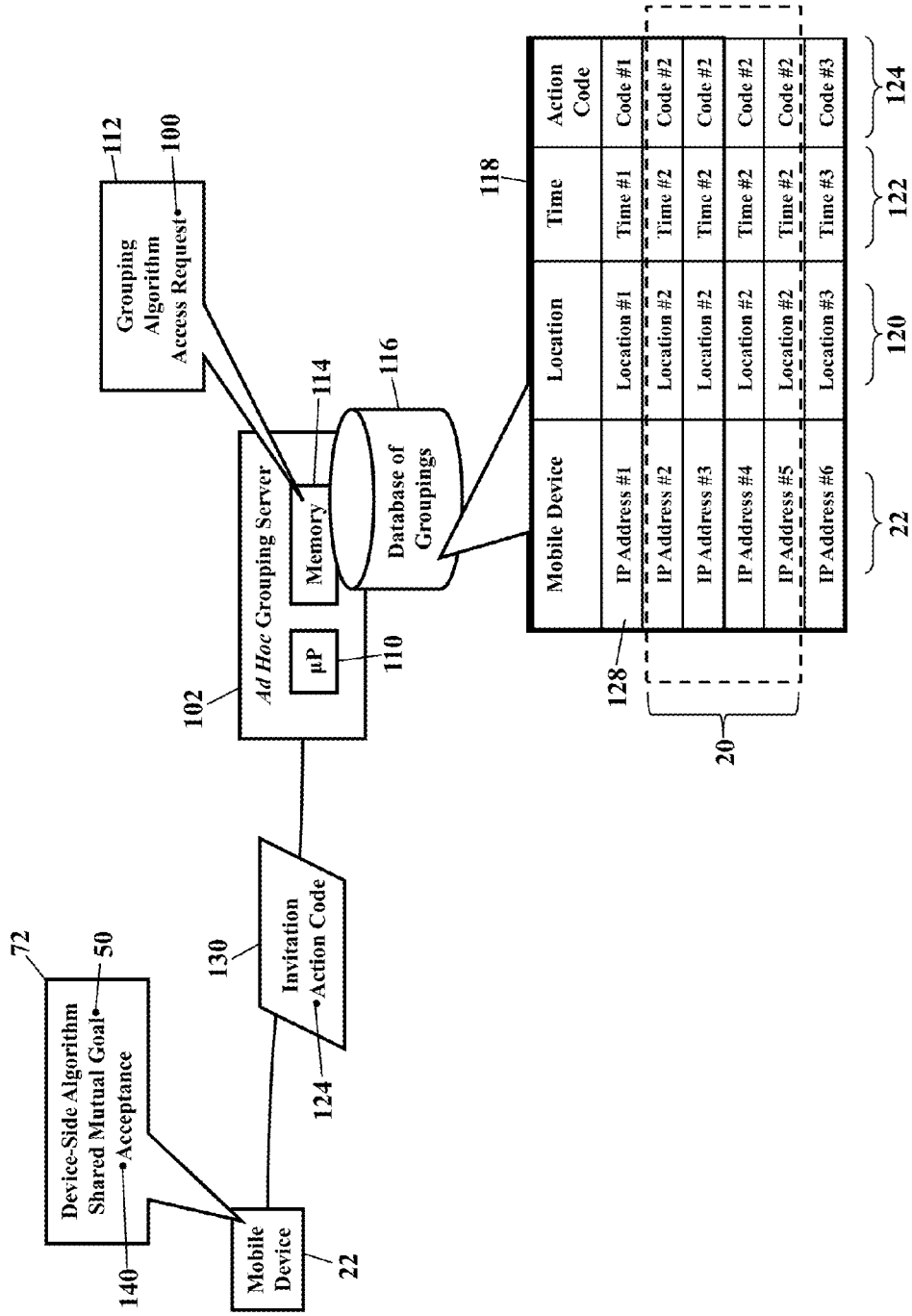
FIG. 15 is a diagram illustrating registration for ad hoc groupings, according to exemplary embodiments.

FIG. 15 is a diagram illustrating registration for ad hoc groupings, according to exemplary embodiments. Here users may centrally register their interest for any ad hoc groupings that wish to form. Some users may wish to publicize their availability for ad hoc groupings on spur of the moment goals 50. That is, some users may wish to be notified of any invitations 130 to join ad hoc groupings. The user may then decide whether she wishes to participate. As FIG. 15 illustrates, a user may thus permit the ad hoc grouping server 102 to track and log the current location 120 of her mobile device 22. Her mobile device 22, for example, may periodically send its global positioning system coordinates to the ad hoc grouping server 102 for entry in the database 116 of groupings. Should anyone submit the access request 100 for the same, or nearly the same, location 120, exemplary embodiments may invite the user's mobile device 22 to join the ad hoc group 20. The ad hoc grouping server 102, in other words, may invite candidate mobile devices 22 based on their matching location 120. The ad hoc grouping server 102 queries the database 116 of groupings for the location 120 specified in the action request 100. The ad hoc grouping algorithm 112 retrieves the network addresses 128 of any mobile devices 22 having the matching location 120. The ad hoc grouping algorithm 112 then causes the ad hoc grouping server 102 to send or forward the invitation 130 to the network address 128 of each candidate mobile device 22 having the matching location 120.

Users may thus register for any ad hoc groupings. By opening up their current location 120, users may receive any invitations 130 for any shared, mutual goal 50 (as defined by the action code 124). When the user's mobile device 22 receives the invitation 130, the user may then evaluate whether she wishes to join the ad hoc group 20 for the same shared, mutual goal 50. She may send the acceptance 140 and reap the benefit of shared, mutual goal 50. The user may, however, decide that she has no interest in joining the ad hoc group 20. Whatever her decision, exemplary embodiments thus allow users to be informed of any spontaneous ad hoc groupings.

Central registration may not be needed for self-management. Mobile devices 22 may self-form and manage their ad hoc grouping, as explained with reference to FIGS. 10-12. In these instances the mobile devices 22 may simply broadcast the action request 100 to willing recipients. If a mobile device 22 is configured to receive solicitations to form ad hoc groupings, then the action request 100 is processed. If participation in the ad hoc grouping is desired, the user's mobile device 22 may send the acceptance 140. The user's group rules 146, in other words, may govern receipt of any action request 100, without centralized moderation.

Figure 16:
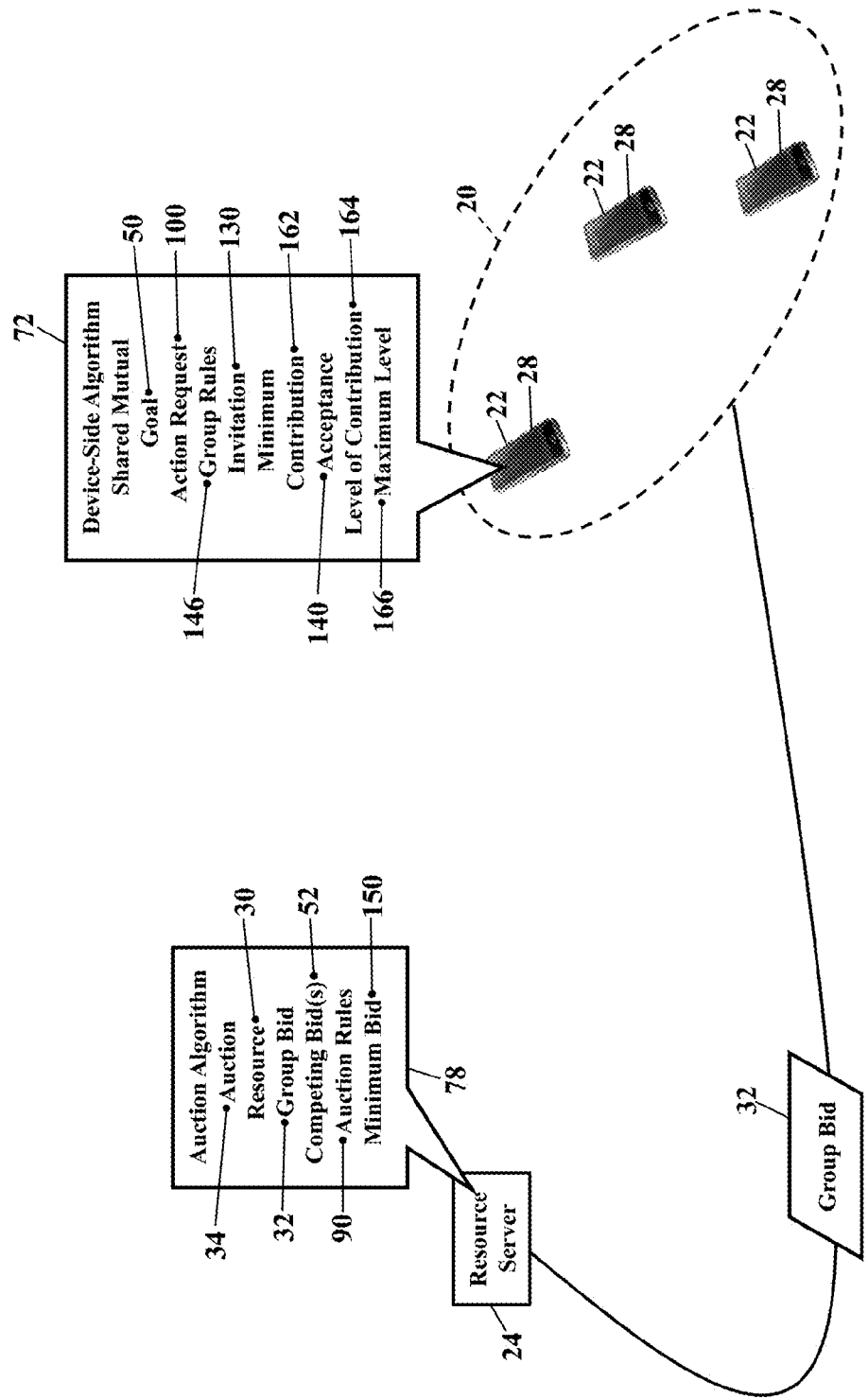
FIG. 16 is a diagram further illustrating competitive bidding, according to exemplary embodiments.

FIG. 16 is a diagram further illustrating competitive bidding, according to exemplary embodiments. This disclosure has explained how individual users, using their mobile devices 22, may spontaneously form the ad hoc group 20 to achieve the shared, mutual goal 50. The leader or initiator of the ad hoc group 20 sends or broadcasts the action request 100 as ACTION_REQUEST[GroupFormation, parameter(s)], where the access code "GroupFormation" seeks to form the ad hoc group 20. As a simple example, one of the parameters may be "AccelerateProximateStoplight." When the action request 100 is received, individual users (or their proxy mobile device 22) determines if participation is desired (as this disclosure above explains).

Sometimes, though, participation requires too much. Some ad hoc groups 20 may require a large financial contribution or commitment that exceeds the user's budget. Indeed, some auctions 34 may have a minimum bid 150 that exceeds the user's budget. Some ad hoc groupings may require hundreds, or thousands, of dollars from each participating member. Some ad hoc groupings, in simple terms, may be too expensive to join. Other ad hoc groupings may require too much time, or too much participation, from the individual user.

Here, then, each user may further define her group rules 146. Any user may define her group rules 146 to filter out or ignore any values or parameters that exceed the user's comfort level. As the user's device-side algorithm 72 evaluates whether participation is desired, the user's group rules 146 may define any parameters for participation and/or for rejection. The device-side algorithm 72, for example, may compare the group rules 146 to the parameters in the auction rules 90, in the action request 100, and/or in the invitation 130. The group rules 146 may thus help the user may decide whether she wishes to participate in the group bid 32. Some ad hoc groupings, for example, may require an individual minimum contribution 162 (whether of money, tokens, time, or any other measure). Some ad hoc groups 20, for example, may not accept members who are unwilling to pay a minimum amount of money or tokens. If the user wishes to participate, her mobile device 22 sends the acceptance 140, perhaps specifying her level 164 of contribution. The acceptance 140 may even specify a maximum level 166 of contribution, above which she will no longer participate. If bidding gets heated, the user may drop out of the ad hoc grouping when her maximum level 166 of contribution is exceeded. The leader or initiator of the ad hoc group 20, or the ad hoc grouping server 102, may evaluate all the acceptances 140 from the participating mobile devices 22. If the ad hoc group 20 can assemble the sufficient group bid 32 to satisfy the auction rules 90, exemplary embodiments may request verifiable payment (e.g., credit card numbers or e-tokens) from each mobile device 22. The group bid 32 is then submitted to the resource server 24 for evaluation.

Contributions may be equal among all members. Sometimes the shared, mutual goal 50 may be structured such that each participating mobile device 22 makes an equal contribution to the group bid 32. The traffic light (illustrated as reference numeral 40 in FIG. 2) is another simple example. If the ad hoc group 20 submits the winning group bid 32, then the traffic light 40 is timed to allow all the member mobile devices 22 (e.g., the users' vehicles 44) to pass through the green light. The financial or token contribution from each vehicle 44 may simply be the amount of the group bid 32 divided by the number of participating vehicles 44. A ten dollar ($10) group bid 32, for example, may be evenly split between ten (10) mobile devices 22, or one dollar ($1) per member mobile device 22. For many auctions 34, this equal billing scenario may be simplest and adequate.

Other times, though, individual contributions may differ. Even though multiple mobile devices 22 may group together and submit the group bid 32, some members may contribute more than other members. Some group members may place a higher value on the shared, mutual goal 50 than other members. Even though all the members of the ad hoc group 20 may share the same mutual goal 50, some members may make a larger contribution to the group bid 32. The leader, or any member, of the ad hoc group 20 may thus creatively assemble different member contributions of the group bid 32. This unequal billing scenario, of course, may complicate negotiations. Again using the example of the traffic light 40, all members of the ad hoc group 20 speed through the green light, even though some members may have contributed more money to the group bid 32. One solution if for the ad hoc grouping server 102 to assign a priority or processional order to the ad hoc group 20 to ensure higher contributing members first receive the resource 30. Lesser ranking contributions of the winning ad hoc group 20 may be moved to rearward positions in the processional order, where there is a greater chance of losing to a subsequent auction 34.

Ad hoc groupings may also be abandoned. There will be times when the ad hoc group 20 fails to form. For example, someone may submit the action request 100, but no one accepts. In this case, the user may choose to go it alone and participate in the auction 34 as an individual bidder. That is, the user bids to solely pay for the resource 30 (such as the expedited traffic light 40). Even if other mobile devices 22 do participate in the group bid 32, perhaps the group bid 32 is insufficient to satisfy the required minimum bid 150. The ad hoc group 20 may thus fail. Finally, abandonment may occur when negotiations are complex, thus requiring too much time to finalize the group bid 32. Whatever the reasons, ad hoc groupings may fail to form.

Figure 17:
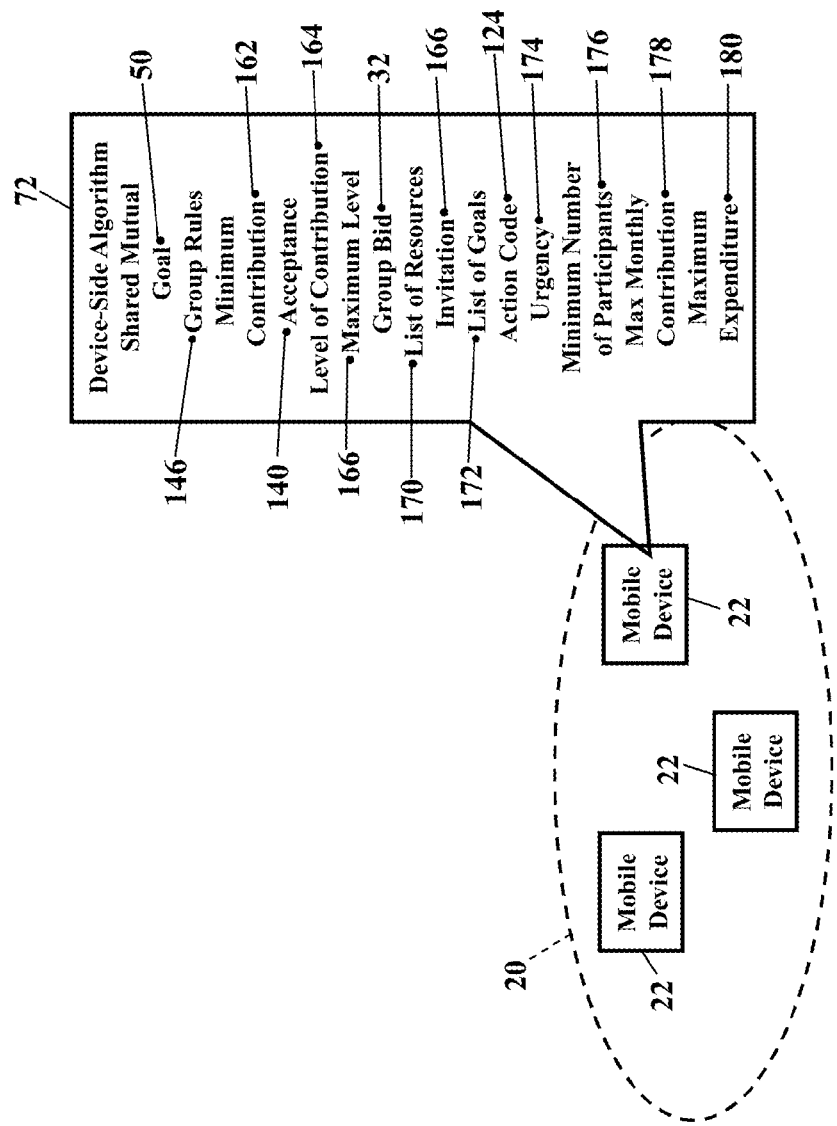
FIG. 17 is a diagram further illustrating personal rules, according to exemplary embodiments.

FIG. 17 is a diagram further illustrating the user's personal group rules 146, according to exemplary embodiments. As the above paragraphs explained, the user's personal group rules 146 may govern individual participation in the ad hoc group 20. The user's personal group rules 146, for example, may store her maximum level 166 of contribution for any group bid 32. The user, for example, may establish a rule that she will pay no more than one dollar ($1) as a micro-contribution 164 to any group bid 32. The user's personal group rules 146 may also define a list 170 of resources for which she will consider bidding. If the action request (illustrated as reference numeral 100 in FIG. 16) does not specify one of the resources 30 in the list 170 of the resources, then the device-side algorithm 72 may have authority to decline the invitation 130. The user's personal group rules 146 may, likewise, define a list 172 of goals for which she will consider bidding. If the invitation 130 does not specify one of the action codes 124 in the list 172 of goals, then the user is likely not interested in participating. The user's personal group rules 146 may further define the dates and times of auctions 34 for which she will, and will not, participate. The user may not want to be notified of auctions 34 occurring during sleeping hours, vacations, or other personally important occasions.

The user's group rules 146 may also specify other considerations. Some auctions 34 and/or invitations 130 may have an urgency 174, for which the user may or may not accept. Some users, in other words, may decline situations in which quick, perhaps ill-informed judgments are required. The user's group rules 146 may also specify a minimum number 176 of participants, thus ensuring her maximum level 166 of contribution for any single group bid 32 is satisfied. The user's group rules 146 may also track and tally or sum her contributions, ensuring a maximum monthly contribution 178 is never exceeded. The user's group rules 146 may even establish an absolute maximum expenditure 180, perhaps on a yearly basis. Exemplary embodiments thus allow the user to monitor and track her participation to ensure her budget is not exceeded. The user's personal group rules 146, in simple terms, may be as detailed as she wishes to ensure she only participates in personally relevant auctions 34.

Figure 18:
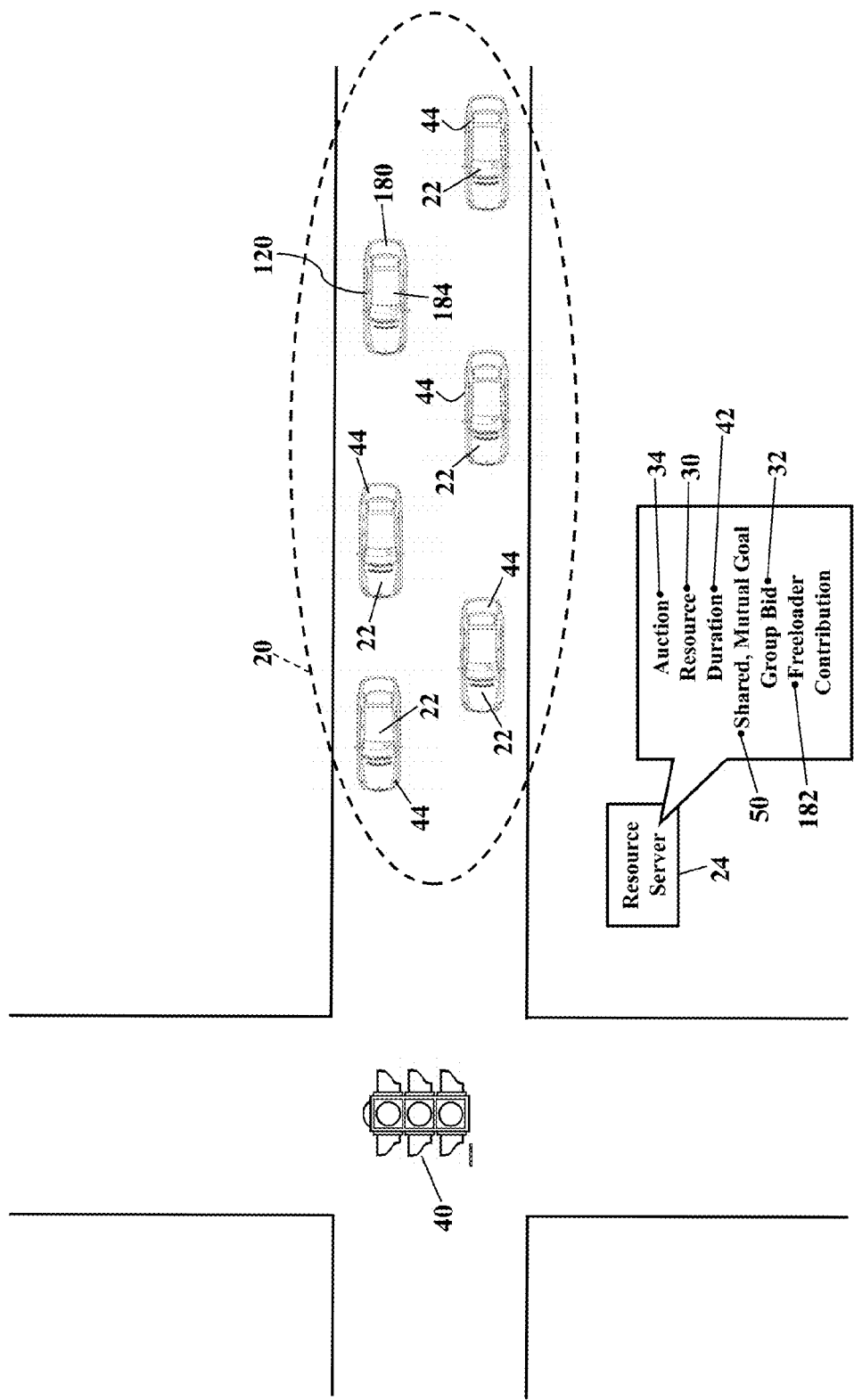
FIG. 18 is a diagram illustrating freeloader considerations, according to exemplary embodiments.

FIG. 18 is a diagram illustrating freeloader considerations, according to exemplary embodiments. Even though the ad hoc group 20 may win the auction 34 and receive the resource 30, there may be non-participants who also receive the same resource 30. Again, considering the traffic light 40, the ad hoc group 20 of vehicles may band together and win the auction 34 to increase the duration 44 of the green light. As the ad hoc group 20 of vehicles drives through the extended green light, other vehicles may also speed along through the same green light. That is, a freeloader vehicle 180 receives the same resource 30 (e.g., the green light) without contributing to the group bid 32. Indeed, fairness is especially questioned if the freeloader vehicle 180 declined to join the ad hoc group 20 of vehicles.

Network addressing may identify freeloaders. Each mobile device 22 usually has a unique network address (such as an Internet Protocol address). As the ad hoc group 20 speeds through the green light, the location and address of each passing or moving mobile device 22 may be monitored. The freeloader vehicle 180, with its freeloader mobile device 20, may thus be identified as passing through the same green light. Indeed, whatever the resource 30, the unique network addresses assigned to different mobile devices 22 may be used to track and identify freeloaders. Any other mechanism, of course, may be used to spot freeloaders, especially those freeloaders that decline to join the ad hoc group 20.

Exemplary embodiments, then, may automatically assess freeloaders. If a freeloader situation is discovered, exemplary embodiments may assess a freeloader contribution 182 from the freeloading vehicle 180 for the shared, mutual goal 50. The freeloader vehicle 180, in other words, would not have made the extended green light but for the group bid 32 by the member vehicles 44. Exemplary embodiments may thus monitor and track the location 120 of any mobile device 22 that receives the same shared, mutual goal 50 (as earlier explained). If a freeloader mobile device 184 receives the same shared, mutual goal 50 without joining the ad hoc group 20, the freeloader mobile device 184 may be assessed the involuntary freeloader contribution 182 to the group bid 32. Should the ad hoc grouping server 102 determine that the freeloader mobile device 184 has a sequential path of locations 120 and times that match a member of the ad hoc group 20, the freeloader mobile device 184 may be assessed the involuntary contribution freeloader contribution 182. Exemplary embodiments may further have the group requester submit a good-faith initial contribution and show an e-receipt to the other vehicles when requesting their contributions. Exemplary embodiments, in other words, may include an escrow system in which each participant keeps reserves. Should the group bid 32 escalate, contribution from each participant's escrow is still assured, thus allowing the group leader to continue bidding without further coordination or negotiation.

The vehicles 44 may be considered the mobile devices 22. As the reader may realize, many modern vehicles have transceivers for cellular, WI-FI®, BLUETOOTH®, satellite, and other communications capabilities. Whatever the communications capability, exemplary embodiments may register and treat any vehicle 44 as one of the mobile devices 22. The ad hoc grouping server 102, for example, may track the current location 120 of any vehicle 44 and invite the vehicle 44 to join any of the ad hoc groupings. As this disclosure explains, the mobile devices 22 and even the vehicles 44 may band together in an ad hoc fashion to achieve the shared, mutual goal 50. Exemplary embodiments are thus not limited to the mobile devices 22 that are carried by, or accompany their respective users, during commutes.

Figure 19:
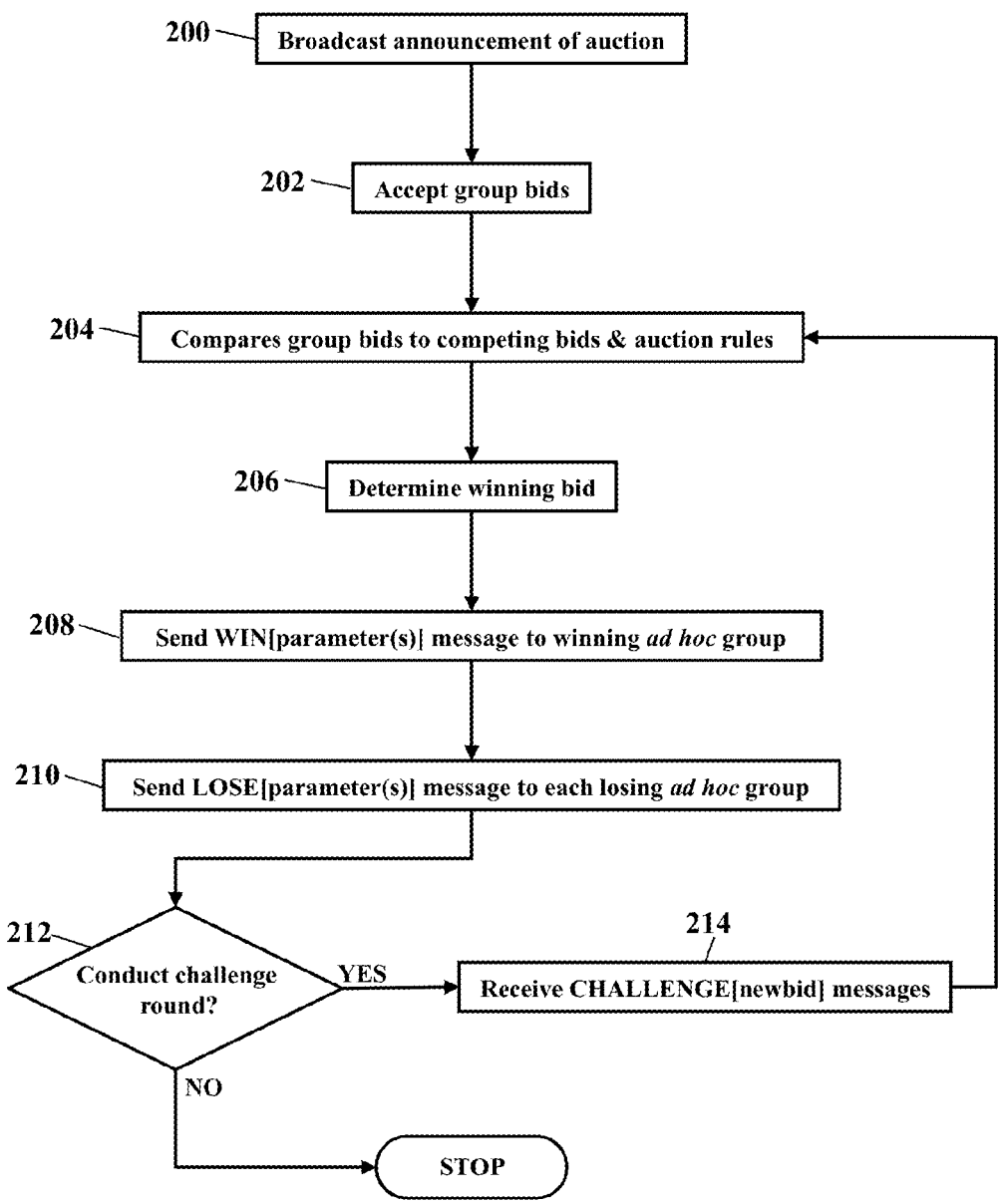
FIG. 19 is a flowchart illustrating a method or algorithm for conducting an auction, according to exemplary embodiments.

FIG. 19 is a flowchart illustrating a method or algorithm for conducting the auction 34, according to exemplary embodiments. Here the auction 34 may be completely managed by the resource server 24. That is, the resource server 24 acts as an auction manager to ensure the auction rules 90 are fairly implemented. Fair and even-handed auction rules 90 ensure that each participant has faith in the auction 34 and that no one mobile device 22, and/or no ad hoc group 20, receives unfair consideration or access to the resource 30. The auction rules 90 are thus especially important in municipal auctions for traffic lights, parking spaces, and access to other municipal services and resources (electricity, water, fire and police protection).

As FIG. 19 illustrates, the resource server 24 evenhandedly conducts the auction 34. As there may be many people who wish to know of the auctioned resource 30, the resource server 24 may access and implement protocols that include additional messages that precede and follow bid submissions. The resource server 24, for example, may broadcast an announcement of the auction 34 (Block 200). The announcement describes the upcoming auction 34 and information for bidding. The announcement may also have the standardized formatting that is commonly understood. The announcement, for example, may be formatted as BIDDING_OPEN[terms], where the announcement has one or more parameters describing the upcoming auction 34 for the resource 30. The announcement is preferably sent to a notification list of network addresses. Interested parties may register to have their names and/or addresses added to the notification list, as is known. The resource server 24 then accepts one or more of the group bids 34 from the ad hoc groups 20 (Block 202). The resource server 24 then compares the group bids 34 to the competing bids 52, according to the auction rules 90 (Block 204). The resource server 24 determines the winning bid (Block 206). The auction protocol may require that the resource server 24 send a WIN[parameter(s)] message to the winning ad hoc group 20, informing them of their winning group bid 32 (Block 208). The WIN[parameter(s)] message may further include an e-voucher or an immediate enablement of the resource 30. The auction protocol may further require that the resource server 24 send a LOSE[parameter(s)] message to each losing ad hoc group 20, informing them of the winning group bid 32 (Block 210). The auction protocol may further permit one or more challenge rounds (Block 212), in which losing ad hoc groups may submit CHALLENGE[newbid] messages to drive up the auction results (Block 214). When the challenge rounds are complete or not permitted (Block 212), the auction concludes.

Figure 20:
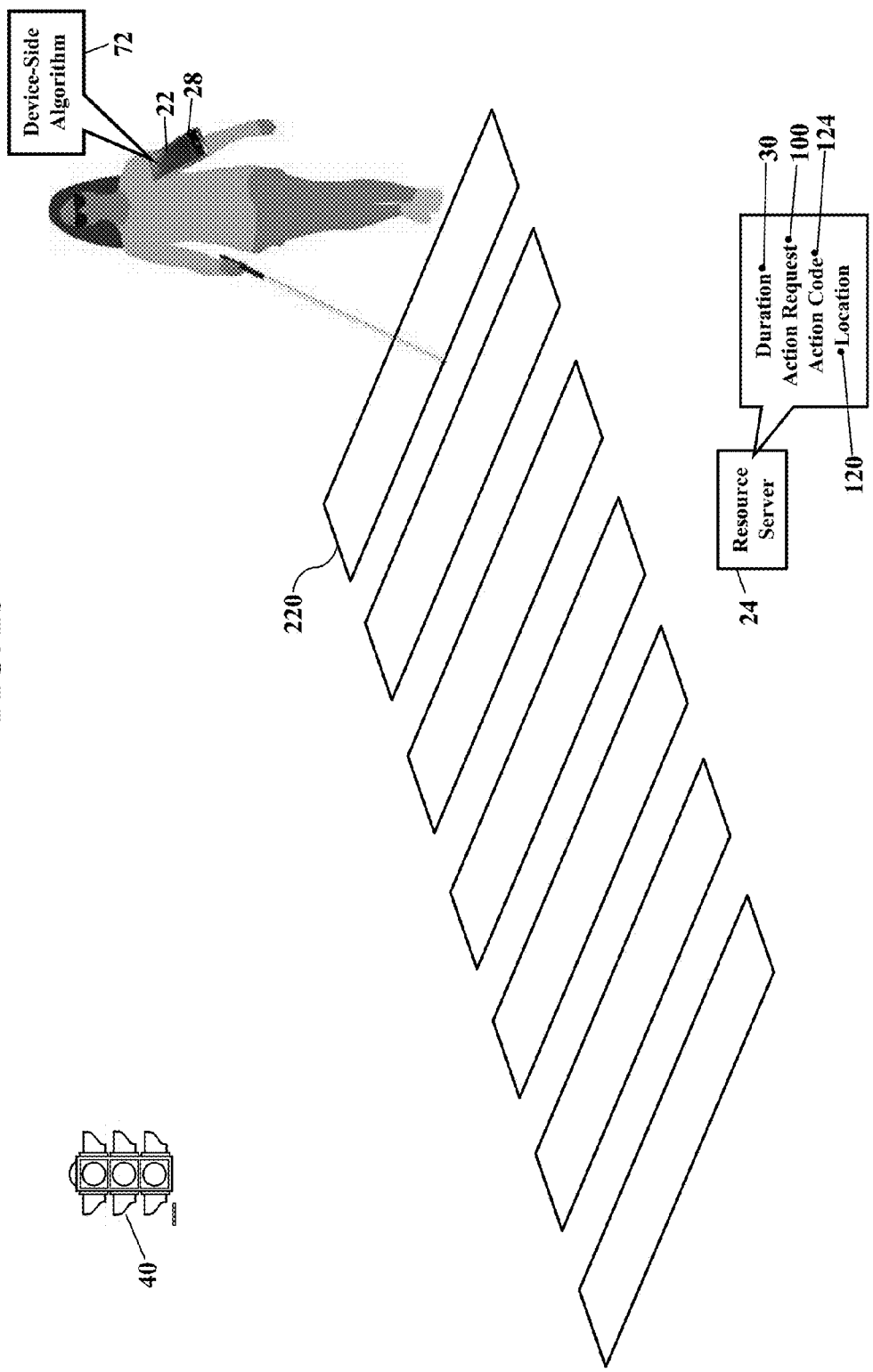
FIG. 20 is a diagram illustrating a crosswalk, according to exemplary embodiments.

FIG. 20 is a diagram illustrating a crosswalk 220, according to exemplary embodiments. FIG. 20 illustrates another simple example for requesting the longer traffic light 40 at the crosswalk 220. As the user approaches the crosswalk 220, the user's mobile device 22 may influence the duration 42 of time for walking the crosswalk 220. The user's mobile device 22 consults the dictionary (illustrated as reference numeral 104 in FIG. 6) to generate the action request 100 as ACTION_REQUEST[CrosswalkDuration, location, duration], where the action code 124 ("CrosswalkDuration") is the standardized dictionary term for influencing the traffic light 40 at the crosswalk 220. The location 120 specifies the geographical location (GPS) of the crosswalk 220 and/or the traffic light 40. The location 120 may be easily obtained by scanning a bar code posted on signage or by GPS latitude/longitude positioning. The duration 42 of time may be any parameter value for increasing or decreasing the length of time that the traffic light 40 maintains a red or green state. The dictionary 104 may include standardized terms, such as abstract values of "CrosswalkSpeedFast" for a bicyclist or jogger and "CrosswalkSpeedSlow" for a wheelchair or elderly pedestrian. As the user approaches the crosswalk 220, exemplary embodiments thus allow the user's mobile device 22 to influence the duration 42 of time for walking the crosswalk 220.

The resource server 24 may even store permissions. When the user's mobile device 22 submits the action request 100, the action request 100 may route to the network address of the resource server 22. When the resource server 22 receives the action request 100, the resource server 22 may recognize the user's mobile device 22 as qualifying for enhanced or increased durations 42 of time. The user's mobile device 22, for example, may have a network address that is matched to a list of preapproved citizens who are authorized to influence the timing of the traffic light 40. The action request 100 may further specify an amount of time that is always added to timing signals for the traffic light 40. That is, the telephone number, Internet Protocol address, or other identifier of the user's mobile device 22 is automatically recognized and approved for longer red lights at the crosswalk 220. The resource server 22 thus adds the amount of time to the duration 42 of the traffic light 40 before changing its state. The traffic light 40, in other words, stays in its red mode of operation for the extra amount of time specified in the action request 100. Should the user be governmentally recognized as needing the additional amount of time to cross the crosswalk 220, exemplary embodiments automatically influence the traffic light 40.

Figure 21:
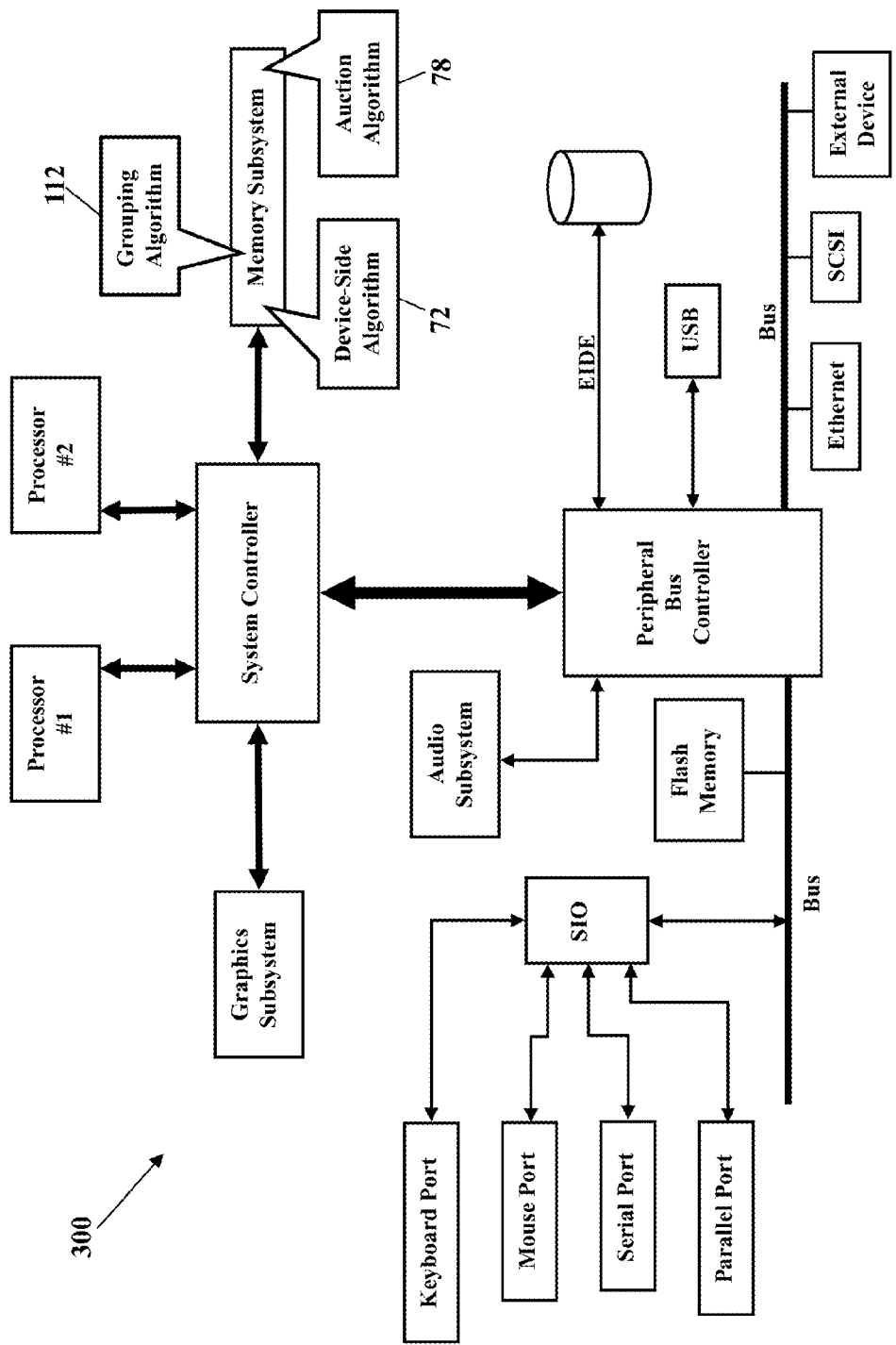
FIGS. 21-22 depict still more operating environments for additional aspects of the exemplary embodiments.

FIG. 21 is a schematic illustrating still more exemplary embodiments. FIG. 21 is a more detailed diagram illustrating a processor-controlled device 300. As earlier paragraphs explained, the device-side algorithm 72, the auction algorithm 78, and/or the grouping algorithm 112 may operate in any processor-controlled device. FIG. 21, then, illustrates the device-side algorithm 72, the auction algorithm 78, and/or the grouping algorithm 112 stored in a memory subsystem of the processor-controlled device 300. One or more processors communicate with the memory subsystem and execute either, some, or all applications. Because the processor-controlled device 300 is well known to those of ordinary skill in the art, no further explanation is needed.

Figure 22:
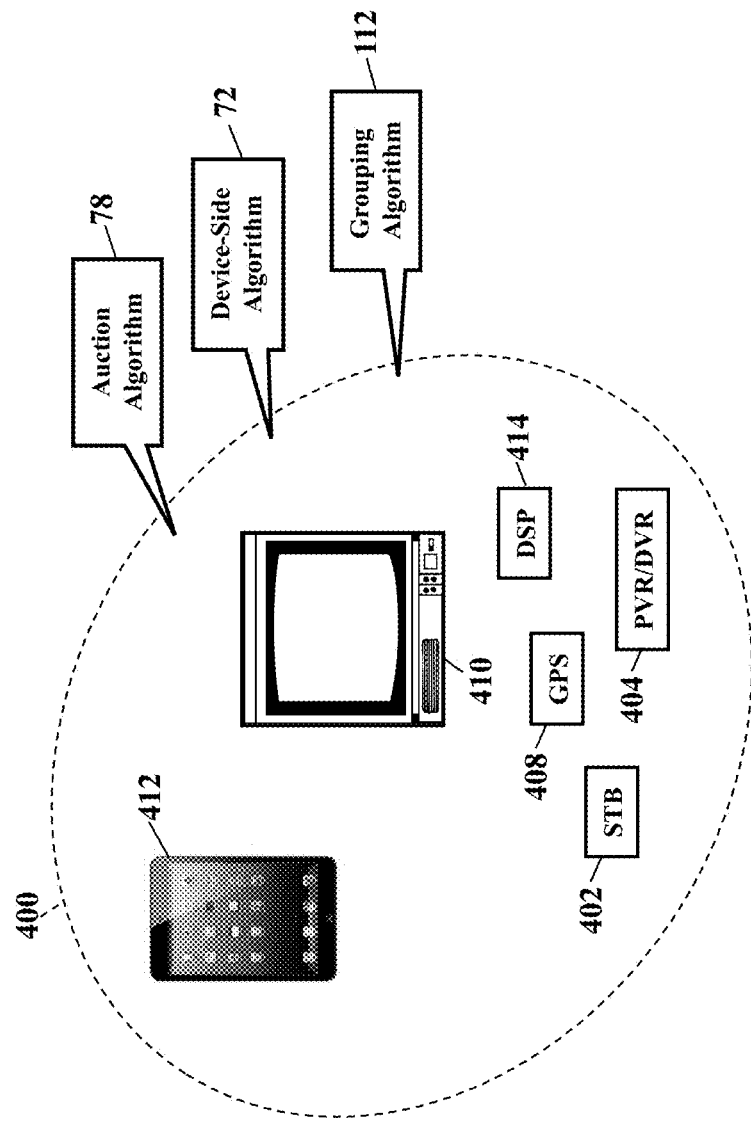

FIG. 22 depicts other possible operating environments for additional aspects of the exemplary embodiments. FIG. 22 illustrates the device-side algorithm 72, the auction algorithm 78, and/or the grouping algorithm 112 operating within various other devices 400. FIG. 22, for example, illustrates that the device-side algorithm 72, the auction algorithm 78, and/or the grouping algorithm 112 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor 50 and/or a digital signal processor (DP/DSP) 414. A big screen display or public sign, for example, may act as a combined resource and arbitrator that accepts bids for content. An airport lounge may thus auction channels shown on their big screen television to highest bidding groups. However, the device 400 may also include network switches, routers, modems, watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for ad hoc groupings, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, at a server comprising a processor, an access request sent from a requesting mobile device, the access request specifying a location associated with a shared, mutual goal for an ad hoc grouping;
storing, in memory of the server, current locations of mobile devices that are registered for ad hoc grouping;
querying the memory for the location specified in the access request to identify candidate mobile devices, among the mobile devices registered for ad hoc grouping, having a current location and a shared, mutual goal that match the location and the shared, mutual goal of the access request;
retrieving network addresses of the candidate mobile devices;
sending invitations to the network addresses of the candidate mobile devices, the invitations inviting the candidate mobile devices to join the ad hoc grouping;
receiving acceptances sent from ones of the candidate mobile devices invited to join the ad hoc grouping; and
forming the ad hoc grouping from the ones of the candidate mobile devices accepting the invitations,
wherein the ad hoc grouping is spontaneously created based on the current location of the ones of the candidate mobile devices, and
wherein the shared, mutual goals of the candidate mobile devices are stored in the memory before the access request is sent by the requesting mobile device.

2. The method of claim 1, further comprising querying the memory for the shared, mutual goal specified in the access request.

3. The method of claim 2, further comprising grouping together the network addresses of the candidate mobile devices matching both the location and the shared, mutual goal specified in the access request.

4. The method of claim 1, further comprising sending a group bid from the server in an auction for a resource, the group bid based on negotiations between the candidate mobile devices forming the ad hoc grouping.

5. The method of claim 4, further comprising determining a processional order for the ad hoc grouping based on an individual contribution from each one of the candidate mobile devices to the group bid.

6. The method of claim 1, further comprising receiving a response at the server that declines to join the ad hoc grouping.

7. The method of claim 1, further comprising determining an equal contribution from each one of the candidate mobile devices forming the ad hoc grouping.

8. A system, comprising:
a processor; and
memory storing instructions that when executed cause the processor to perform operations, the operations comprising:
receiving an access request sent from a requesting mobile device, the access request specifying a location associated with a shared, mutual goal for an ad hoc grouping;
storing, in the memory, current locations of mobile devices that are registered for ad hoc grouping;
querying the memory for the location specified in the access request to identify candidate mobile devices, among the mobile devices registered for ad hoc grouping, having a current location and a shared, mutual goal that match the location and the shared, mutual goal of the access request;
retrieving network addresses of the candidate mobile devices;
sending invitations to the network addresses of the candidate mobile devices, the invitations inviting the candidate mobile devices to join the ad hoc grouping;
receiving acceptances sent from ones of the candidate mobile devices invited to join the ad hoc grouping; and
forming the ad hoc grouping from the ones of the candidate mobile devices accepting the invitations,
wherein the ad hoc grouping is spontaneously created based on the current location of the ones of the candidate mobile devices, and
wherein the shared, mutual goals of the candidate mobile devices are stored in the memory before the access request is sent by the requesting mobile device.

9. The system of claim 8, wherein the operations further comprise querying the memory for the shared, mutual goal specified in the access request.

10. The system of claim 9, wherein the operations further comprise grouping together the network addresses of the candidate mobile devices matching both the location and the shared, mutual goal specified in the access request.

11. The system of claim 8, wherein the operations further comprise sending a group bid in an auction for a resource, the group bid based on negotiations between the candidate mobile devices forming the ad hoc grouping.

12. The system of claim 11, wherein the operations further comprise determining a processional order for the ad hoc grouping based on an individual contribution from each one of the candidate mobile devices to the group bid.

13. The system of claim 8, wherein the operations further comprise receiving a response that declines to join the ad hoc grouping.

14. The system of claim 8, wherein the operations further comprise determining an equal contribution from each one of the candidate mobile devices forming the ad hoc grouping.

15. A memory storing instructions that when execute cause a processor to perform operations, the operations comprising:
receiving an access request sent from a requesting mobile device, the access request specifying a location and a shared, mutual goal for an ad hoc grouping;
storing current locations of mobile devices that are registered for ad hoc grouping;
querying for the location specified in the access request to identify candidate mobile devices, among the mobile devices registered for ad hoc grouping, having a current location and a shared, mutual goal that match the location and the shared, mutual goal of the access request;
retrieving network addresses of the candidate mobile devices;

sending invitations to the network addresses of the candidate mobile devices, the invitations inviting the candidate mobile devices to join the ad hoc grouping;

receiving acceptances sent from ones of the candidate mobile devices invited to join the ad hoc grouping; and forming the ad hoc grouping from the ones of the candidate mobile devices accepting the invitations, wherein the ad hoc grouping is spontaneously created from the ones of the candidate mobile devices, and wherein the shared, mutual goals of the candidate mobile devices are stored before the access request is sent by the requesting mobile device.

16. The memory of claim 15, wherein the operations further comprise querying for the shared, mutual goal specified in the access request.

17. The memory of claim 16, wherein the operations further comprise grouping together the network addresses of the candidate mobile devices matching both the location and the shared, mutual goal specified in the access request.

18. The memory of claim 15, wherein the operations further comprise sending a group bid in an auction for a resource, the group bid based on negotiations between the candidate mobile devices forming the ad hoc grouping.

19. The memory of claim 18, wherein the operations further comprise determining a processional order for the ad hoc grouping based on an individual contribution from each one of the candidate mobile devices to the group bid.

20. The memory of claim 15, wherein the operations further comprise time determining an equal contribution from each one of the candidate mobile devices forming the ad hoc grouping.

* * * * *